US011047285B2

(12) United States Patent
Hirai et al.

(10) Patent No.: US 11,047,285 B2
(45) Date of Patent: Jun. 29, 2021

(54) CONTROL APPARATUS OF INTERNAL COMBUSTION ENGINE

(71) Applicant: TOYOTA JIDOSHA KABUSHIKI KAISHA, Aichi (JP)

(72) Inventors: Takuya Hirai, Mishima (JP); Takashi Hotta, Susono (JP); Yuji Miyoshi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/671,176

(22) Filed: Nov. 1, 2019

(65) Prior Publication Data

US 2020/0248640 A1 Aug. 6, 2020

(30) Foreign Application Priority Data

Jan. 31, 2019 (JP) ............................. JP2019-015805

(51) Int. Cl.

| | |
|---|---|
| ***F01N 5/02*** | (2006.01) |
| ***F02D 41/00*** | (2006.01) |
| ***F02M 26/47*** | (2016.01) |
| ***F02M 26/33*** | (2016.01) |
| ***F01N 3/02*** | (2006.01) |
| ***F02M 26/28*** | (2016.01) |
| *F02M 26/00* | (2016.01) |
| *F02M 26/23* | (2016.01) |
| *F02M 26/30* | (2016.01) |
| *F02D 9/02* | (2006.01) |

(52) U.S. Cl.

CPC ............. *F01N 5/02* (2013.01); *F01N 3/0205* (2013.01); *F02D 41/0072* (2013.01); *F02D 41/0077* (2013.01); *F02M 26/28* (2016.02); *F02M 26/33* (2016.02); *F02M 26/47* (2016.02); *F01N 2240/02* (2013.01); *F01N 2240/36* (2013.01); *F02D 2009/0223* (2013.01); *F02D 2041/0075* (2013.01); *F02M 26/23* (2016.02); *F02M 26/30* (2016.02); *F02M 2026/004* (2016.02)

(58) Field of Classification Search

None

See application file for complete search history.

(56) References Cited

U.S. PATENT DOCUMENTS 6,155,042 A * 12/2000 Perset ................... F01N 3/2046 60/278
6,543,427 B2 * 4/2003 Kawasaki ............. F02M 26/16 123/568.12
8,359,845 B2 * 1/2013 Prior ...................... F02M 26/25 60/320

(Continued)

FOREIGN PATENT DOCUMENTS

JP 2009-127513 A 6/2009

*Primary Examiner* — Kevin R Steckbauer
(74) *Attorney, Agent, or Firm* — Hauptman Ham, LLP

(57) ABSTRACT

A control apparatus of an internal combustion engine controls a heat exchange cooling water flow rate which is a flow rate of cooling water supplied to an exhaust heat recovery cooler apparatus, to a larger flow rate when the control apparatus executes an EGR control, and the exhaust heat recovery cooler apparatus performs an exhaust heat recovery function, than when the control apparatus executes the EGR control, and the exhaust heat recovery cooler apparatus does not perform the exhaust heat recovery function.

16 Claims, 16 Drawing Sheets

(56) References Cited

U.S. PATENT DOCUMENTS

| | | | | |
|---|---|---|---|---|
| 8,402,757 | B2 * | 3/2013 | Takeishi | F02G 5/02 60/320 |
| 8,429,895 | B2 * | 4/2013 | Kawazu | F02M 26/28 60/278 |
| 8,612,117 | B2 * | 12/2013 | Senda | F02P 5/1516 701/103 |
| 9,404,409 | B2 * | 8/2016 | Pursifull | F02M 26/06 |
| 9,636,973 | B2 * | 5/2017 | Pursifull | F02M 26/10 |
| 9,689,295 | B1 * | 6/2017 | Uhrich | F01N 11/005 |
| 9,845,750 | B2 * | 12/2017 | Styles | F02D 41/0055 |
| 9,909,541 | B1 * | 3/2018 | Bevan | B60H 1/00314 |
| 9,957,871 | B2 * | 5/2018 | Uhrich | F02M 26/22 |
| 10,087,809 | B2 * | 10/2018 | Lee | F02G 5/02 |
| 10,107,213 | B2 * | 10/2018 | Uhrich | F02D 41/0082 |
| 10,202,881 | B2 * | 2/2019 | Hebert | F02M 26/28 |
| 10,323,587 | B2 * | 6/2019 | Schwartz | F02D 41/005 |
| 10,450,938 | B2 * | 10/2019 | Nagai | F02B 29/0412 |
| 10,487,714 | B2 * | 11/2019 | Uhrich | F02M 26/33 |
| 10,487,782 | B2 * | 11/2019 | Bevan | F01N 3/005 |
| 10,578,036 | B2 * | 3/2020 | Uhrich | F01N 13/009 |
| 10,618,380 | B2 * | 4/2020 | Jentz | F01N 5/02 |
| 2001/0047798 | A1 * | 12/2001 | Kawasaki | F02M 26/25 123/568.12 |
| 2010/0242452 | A1 * | 9/2010 | Kawazu | F02M 26/50 60/299 |
| 2010/0251703 | A1 * | 10/2010 | Takeishi | F01N 13/009 60/320 |
| 2011/0004392 | A1 * | 1/2011 | Senda | F02P 5/1516 701/102 |
| 2011/0088672 | A1 * | 4/2011 | Prior | F02M 26/26 123/568.12 |
| 2014/0352303 | A1 * | 12/2014 | Santoso | F01N 9/00 60/620 |
| 2015/0121847 | A1 * | 5/2015 | Pursifull | F02D 41/0077 60/274 |
| 2016/0339764 | A1 * | 11/2016 | Pursifull | F01N 11/002 |
| 2017/0184008 | A1 * | 6/2017 | Nagai | F01P 3/02 |
| 2017/0218826 | A1 * | 8/2017 | Uhrich | F01N 9/00 |
| 2017/0218865 | A1 * | 8/2017 | Styles | F02D 41/0052 |
| 2017/0268400 | A1 * | 9/2017 | Lee | F01N 5/02 |
| 2017/0292431 | A1 * | 10/2017 | Uhrich | F01N 11/005 |
| 2018/0087430 | A1 * | 3/2018 | Hebert | F02D 41/0047 |
| 2018/0119624 | A1 * | 5/2018 | Schwartz | F01N 5/02 |
| 2018/0128145 | A1 * | 5/2018 | Uhrich | F01N 1/168 |
| 2018/0156142 | A1 * | 6/2018 | Uhrich | F01N 13/008 |
| 2018/0195470 | A1 * | 7/2018 | Bevan | F01N 3/005 |
| 2018/0355809 | A1 * | 12/2018 | Uhrich | F01N 13/08 |
| 2019/0039437 | A1 * | 2/2019 | Jentz | B60H 1/025 |
| 2019/0264625 | A1 * | 8/2019 | Schwartz | F02D 41/1446 |

* cited by examiner

CONTROL APPARATUS OF INTERNAL COMBUSTION ENGINE

RELATED APPLICATIONS

The present application claims priority to Japanese Patent Application No. 2019-015805, filed Jan. 31, 2019, the disclosure of which is hereby incorporated by reference herein in its entirety.

BACKGROUND

Field

The invention relates to a control apparatus of an internal combustion engine for controlling a flow rate of cooling water.

Description of the Related Art

There is known an internal combustion engine provided with an EGR apparatus for supplying, to an intake passage as an EGR gas, an exhaust gas discharged from combustion chambers to an exhaust passage. Also, there is known the internal combustion engine provided with an exhaust heat recovery cooler apparatus for recovering heat of the exhaust gas with cooling water by (i) cooling the exhaust gas to be supplied as the EGR gas by the cooling water and (ii) cooling the exhaust gas other than the exhaust gas to be supplied as the EGR gas by the cooling water (for example, JP 2009-127513 A). Hereinafter, the exhaust gas other than the EGR gas will be referred to as "the non-EGR gas".

There is an optimal temperature as a temperature of the EGR gas. The optimal temperature is lower than a temperature of the exhaust gas just discharged from the combustion chambers. Therefore, it is desired to supply the EGR gas to the intake passage after the EGR gas is cooled.

In this regard, an ability of the exhaust heat recovery apparatus to cool the exhaust gas to be supplied as the EGR gas is not enough if a flow rate of the cooling water supplied to the exhaust heat recovery cooler apparatus is controlled, only based on a flow rate of the non-EGR gas when the exhaust heat recovery cooler apparatus changes from a state of cooling the non-EGR gas without cooling the exhaust gas to be supplied as the EGR gas to a state of cooling both of the non-EGR gas and the exhaust gas to be supplied as the EGR gas. In this case, the temperature of the EGR gas may not be controlled to the optimal temperature.

SUMMARY

The invention has been made for solving problems described above. An object of the invention is to a control apparatus of the internal combustion engine which can decrease the temperature of the EGR gas to the optimal temperature when the exhaust heat recovery cooler apparatus changes from the state of cooling the non-EGR gas without cooling the exhaust gas to be supplied as the EGR gas to the state of cooling both of the non-EGR gas and the exhaust gas to be supplied as the EGR gas.

A control apparatus of an internal combustion engine according to the invention comprises an EGR apparatus, an exhaust heat recovery cooler apparatus, and an electronic control unit.

The EGR apparatus has an EGR gas supply function. The EGR gas supply function is to supply, to an intake passage of the internal combustion engine as an EGR gas, at least a part of an exhaust gas discharged from at least one combustion chamber of the internal combustion engine to an exhaust passage of the internal combustion engine.

The exhaust heat recovery cooler apparatus has an exhaust gas supply function and an exhaust heat recovery function.

The exhaust gas supply function is to (i) draw at least a part of the exhaust gas, which is discharged from the at least one combustion chamber, into the exhaust heat recovery cooler apparatus from the exhaust passage, (ii) cool the drawn exhaust gas by cooling water, and (ill) supply the cooled exhaust gas to the EGR apparatus as the EGR gas when an EGR control to supply the exhaust gas to the intake passage as the EGR gas by the EGR apparatus is executed.

The exhaust heat recovery function is to (i) draw at least a part of the exhaust gas, which is discharged from the at least one combustion chamber, into the exhaust heat recovery cooler apparatus from the exhaust passage, (ii) cool the drawn exhaust gas by cooling water, and (iii) return the cooled exhaust gas to the exhaust passage.

The electronic control unit controls an activation of the EGR apparatus.

The electronic control unit is configured to control a heat exchange cooling water flow rate which is a flow rate of the cooling water supplied to the exhaust heat recovery cooler apparatus, to a larger flow rate when (i) the electronic control unit controls the activation of the EGR apparatus to execute the EGR control, and (ii) the exhaust heat recovery function is performed, than when (i) the electronic control unit controls the activation of the EGR apparatus to execute the EGR control, and (ii) the exhaust heat recovery function is not performed.

A flow rate of the exhaust gas drawn into the exhaust heat recovery cooler apparatus from the exhaust passage is larger when the EGR control is executed, and the exhaust heat recovery function is performed, than when the EGR control is executed, and the exhaust heat recovery function is not performed. Thus, a temperature of the exhaust gas to be supplied as the EGR gas in executing the EGR control and performing the exhaust heat recovery function may not be decreased to the optimal temperature by the exhaust heat recovery cooler apparatus if the heat exchange cooling water flow rate is controlled to a flow rate capable of decreasing the temperature of the exhaust gas to be supplied as the EGR gas to the optimal temperature in executing the EGR gas control without performing the exhaust heat recovery function. With the invention, the heat exchange cooling water flow rate is controlled to the larger flow rate when the EGR control is executed, and the exhaust heat recovery function is performed, than when the EGR control is executed, and the exhaust heat recovery function is not performed. Thereby, it can be ensured to decrease the temperature of the exhaust gas to be supplied as the EGR gas to the optimal temperature when the EGR control is executed, and the exhaust heat recovery function is performed.

According to an aspect of the invention, the electronic control unit may be configured to control the heat exchange cooling water flow rate to the larger flow rate when (i) the electronic control unit controls the activation of the EGR apparatus to execute the EGR control, (ii) the exhaust heat recovery function is performed, and (ill) a flow rate of the exhaust gas drawn into the exhaust heat recovery cooler apparatus is relatively large, than when (i) the electronic control unit controls the activation of the EGR apparatus to execute the EGR control, (ii) the exhaust heat recovery function is performed, and (iii) the flow rate of the exhaust gas drawn into the exhaust heat recovery cooler apparatus is relatively small.

An ability of the exhaust heat recovery cooler apparatus requested to cool the exhaust gas to be supplied as the EGR gas to decrease the temperature of the exhaust gas to be supplied as the EGR gas to the optimal temperature is larger when the flow rate of the exhaust gas drawn into the exhaust heat recovery cooler apparatus is relatively large, than when the flow rate of the exhaust gas drawn into the exhaust heat recovery cooler apparatus is relatively small. With this aspect of the invention, the heat exchange cooling water flow rate is set to the larger flow rate when the flow rate of the exhaust gas drawn into the exhaust heat recovery cooler apparatus is relatively large, than when the flow rate of the exhaust gas drawn into the exhaust heat recovery cooler apparatus is relatively small. Thereby, it can be ensured that the temperature of the exhaust gas to be supplied as the EGR gas is decreased to the optimal temperature when (i) the EGR control is executed, (ii) the exhaust heat recovery function is performed, and (iii) the flow rate of the exhaust gas drawn into the exhaust heat recovery cooler apparatus is relatively large.

According to another aspect of the invention, the electronic control unit may be configured to control the heat exchange cooling water flow rate to the flow rate increased as the flow rate of the exhaust gas drawn into the exhaust heat recovery cooler apparatus increases when (i) the electronic control unit controls the activation of the EGR apparatus to execute the EGR control, and (ii) the exhaust heat recovery function is performed.

As described above, the ability of the exhaust heat recovery cooler apparatus required to cool the exhaust gas to be supplied as the EGR gas to decrease the temperature of the exhaust gas to be supplied as the EGR gas to the optimal temperature when the flow rate of the exhaust gas drawn into the exhaust heat recovery cooler apparatus is relatively large, than when the flow rate of the exhaust gas drawn into the exhaust heat recovery cooler apparatus is relatively small. Thus, the temperature of the exhaust gas to be supplied as the EGR gas can be surely decreased to the optimal temperature by controlling the heat exchange cooling water flow rate to the flow rate, depending on the flow rate of the exhaust gas drawn into the exhaust heat recovery cooler apparatus when (i) the EGR control is executed, and (ii) the exhaust heat recovery function is performed. With this aspect of the invention, the heat exchange cooling water flow rate is controlled to the flow rate increased as the flow rate of the exhaust gas drawn into the exhaust heat recovery cooler apparatus increases when (i) the EGR control is executed, and (ii) the exhaust heat recovery function is performed. Thereby, it can be ensured to decrease the temperature of the exhaust gas to be supplied as the EGR gas to the optimal temperature when (i) the EGR control is executed, and (ii) the exhaust heat recovery function is performed.

According to further another aspect of the invention, the electronic control unit may be configured to control the heat exchange cooling water flow rate to the larger flow rate when (i) the electronic control unit controls the activation of the EGR apparatus to execute the EGR control, (ii) the exhaust heat recovery function is performed, and (ill) a flow rate of the exhaust gas discharged from the at least one combustion chamber to the exhaust passage is equal to or greater than a predetermined flow rate, than when (i) the electronic control unit controls the activation of the EGR apparatus to execute the EGR control, (ii) the exhaust heat recovery function is performed, and (iii) the flow rate of the exhaust gas discharged from the at least one combustion chamber to the exhaust passage is smaller than the predetermined flow rate.

The flow rate of the exhaust gas drawn into the exhaust heat recovery cooler apparatus is larger when the flow rate of the exhaust gas discharged from the combustion chamber to the exhaust passage is relatively large, than when the flow rate of the exhaust gas discharged from the combustion chamber to the exhaust passage is relatively small. Thus, the temperature of the exhaust gas to be supplied as the EGR gas can be surely decreased to the optimal temperature by controlling the heat exchange cooling water flow rate, depending on the flow rate of the exhaust gas discharged from the combustion chamber to the exhaust passage when (i) the EGR control is executed, and (ii) the exhaust heat recovery function is performed. With this aspect of the invention, the heat exchange cooling water flow rate is controlled to the larger flow rate when (i) the EGR control is executed, (ii) the exhaust heat recovery function is performed, and (iii) the flow rate of the exhaust gas discharged from the combustion chamber to the exhaust passage is equal to or greater than the predetermined flow rate, than when (i) the EGR control is executed, (ii) the exhaust heat recovery function is performed, and (iii) the flow rate of the exhaust gas discharged from the combustion chamber to the exhaust passage is smaller than the predetermined flow rate. Thereby, it can be ensured to decrease the temperature of the exhaust gas to be supplied as the EGR gas to the optimal temperature when (i) the EGR control is executed, and (ii) the exhaust heat recovery function is performed.

According to further another aspect of the invention, the electronic control unit may be configured to control the heat exchange cooling water flow rate to the larger flow rate when (i) the electronic control unit controls the activation of the EGR apparatus to execute the EGR control, (ii) the exhaust heat recovery function is not performed, and (iii) a flow rate of the EGR gas is relatively large, than when (i) the electronic control unit controls the activation of the EGR apparatus to execute the EGR control, (ii) the exhaust heat recovery function is not performed, and (iii) the flow rate of the EGR gas is relatively small.

An entirety of the exhaust gas drawn into the exhaust heat recovery cooler apparatus is supplied to the EGR apparatus as the EGR gas when (i) the EGR control is executed, and (ii) the exhaust heat recovery function is not performed. Therefore, the ability of the exhaust heat recovery cooler apparatus requested to cool the exhaust gas to be supplied as the EGR gas depends on the flow rate of the exhaust gas supplied to the EGR apparatus as the EGR gas. With this aspect of the invention, the heat exchange cooling water flow rate is set to the larger flow rate when (i) the EGR control is executed, (ii) the exhaust heat recovery function is not performed, and (iii) the flow rate of the EGR gas is relatively large, than when (i) the EGR control is executed, (ii) the exhaust heat recovery function is not performed, and (iii) the flow rate of the EGR gas is relatively small. Thereby, it can be ensured to decrease the temperature of the exhaust gas to be supplied as the EGR gas to the optimal temperature when (i) the EGR control is executed, and (ii) the exhaust heat recovery function is not performed.

According to further another aspect of the invention, the electronic control unit may be configured to control the heat exchange cooling water flow rate to the flow rate increased as the flow rate of the EGR gas increases when (i) the electronic control unit controls the activation of the EGR apparatus to execute the EGR control, and (ii) the exhaust heat recovery function is not performed.

The temperature of the exhaust gas to be supplied as the EGR gas can be surely decreased to the optimal temperature by controlling the heat exchange cooling water flow rate to the flow rate, depending on the flow rate of the EGR gas when (i) the EGR control is executed, and (ii) the exhaust heat recovery function is not performed. With this aspect of the invention, the heat exchange cooling water flow rate is controlled to the flow rate increased as the flow rate of the EGR gas increases when (i) the EGR control is executed, and (ii) the exhaust heat recovery function is not performed. Thereby, it can be ensured to decrease the temperature of the exhaust gas to be supplied as the EGR gas to the optimal temperature when (i) the EGR control is executed, and (ii) the exhaust heat recovery function is not performed.

According to further another aspect of the invention, the control apparatus may comprise a pump which supplies the cooling water to the exhaust heat recovery cooler apparatus. In this case, the electronic control unit may be configured to control the heat exchange cooling water flow rate by controlling an activation of the pump.

With this aspect of the invention, the heat exchange cooling water flow rate can be controlled by controlling the activation of the pump.

According to further another aspect of the invention, the control apparatus may comprise a cooling water flow rate control valve which controls the flow rate of the cooling water supplied to the exhaust heat recovery cooler apparatus from the pump in this case, the electronic control unit may be configured to control the heat exchange cooling water flow rate by controlling (i) the activation of the pump and (ii) an opening degree of the cooing water flow rate control valve.

With this aspect of the invention, the heat exchange cooling water flow rate can be controlled by controlling the activations of the pump and the opening degree of the cooling water flow rate control valve.

According to further another aspect of the invention, the electronic control unit may be configured to control the activation of the EGR apparatus to execute the EGR control when a temperature of the cooling water discharged from the internal combustion engine is equal to or higher than a predetermined first temperature threshold.

According to further another aspect of the invention, the exhaust heat recovery cooler apparatus may be configured to perform the exhaust heat recovery function when a temperature of the cooling water supplied to the exhaust heat recovery cooler apparatus is lower than a predetermined second temperature threshold.

According to further another aspect of the invention, the electronic control unit may be configured to control the activation of the EGR apparatus to execute the EGR control when a temperature of the cooling water discharged from the internal combustion engine is equal to or higher than a predetermined first temperature threshold. In this case, the exhaust heat recovery cooler apparatus may be configured to perform the exhaust heat recovery function when a temperature of the cooling water supplied to the exhaust heat recovery cooler apparatus is lower than a predetermined second temperature threshold. Further, in this case, the predetermine second temperature threshold may be set to a temperature higher than the predetermined first temperature threshold.

According to further another aspect of the invention, the electronic control unit may be configured to control the heat exchange cooling water flow rate to a minimum flow rate when (i) the electronic control unit controls the activation of the EGR apparatus to stop executing the EGR control, and (ii) the exhaust heat recovery function is performed.

The elements of the invention are not limited to elements of the embodiment. The other objects, features and accompanied advantages of the invention can be easily understood from the description of the embodiment of the invention along with the drawings.

DESCRIPTION OF THE PREFERRED EMBODIMENTS

Below, a control apparatus of an internal combustion engine according to an embodiment of the invention will be described with reference to the drawings. Hereinafter, the control apparatus according to the embodiment of the invention will be referred to as "the embodiment control apparatus".

Figure 1:
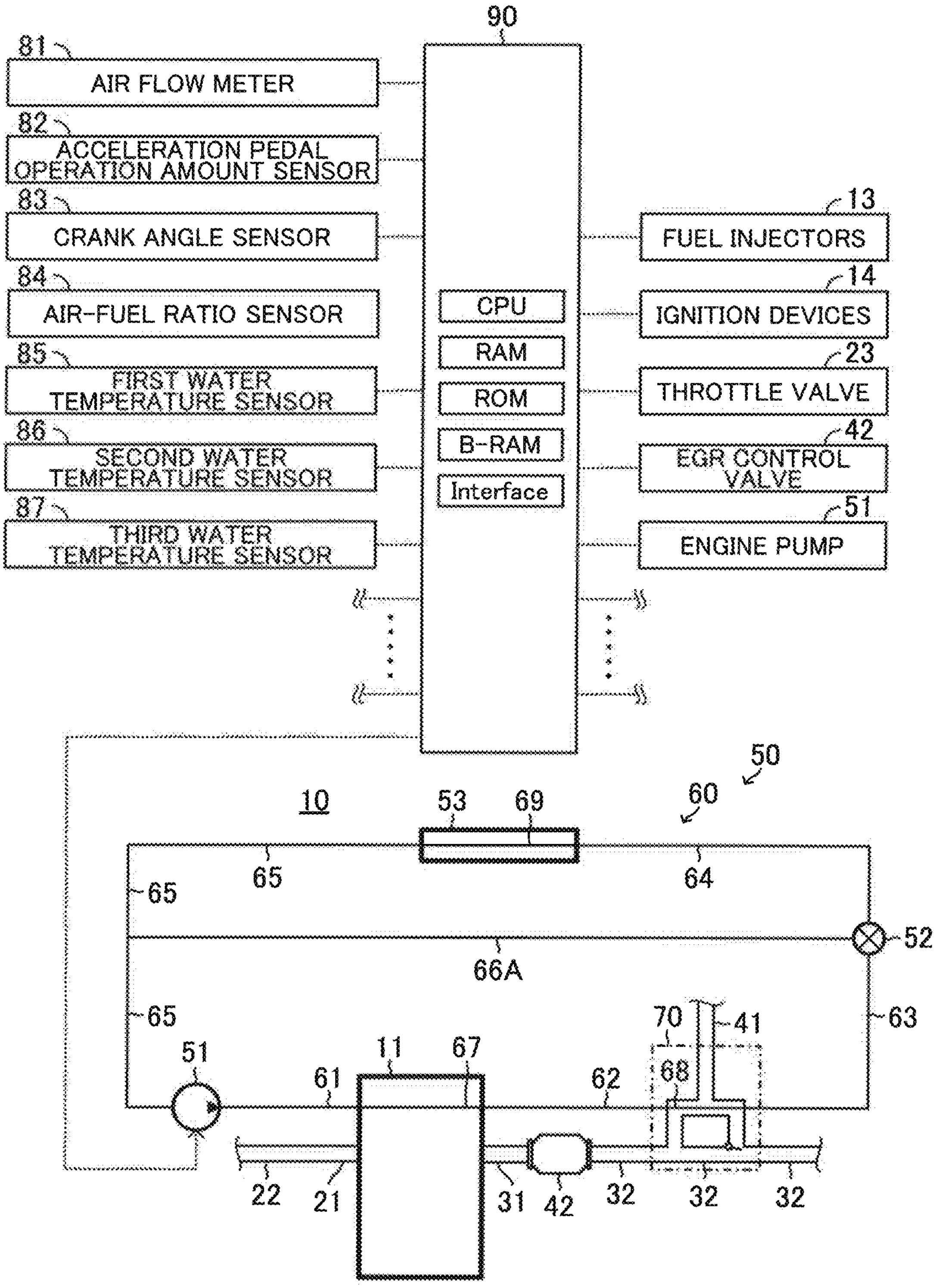
FIG. 1 is a view for showing an internal combustion engine, to which a control apparatus according to an embodiment of the invention is applied.

As shown in FIG. 1, the embodiment control apparatus includes an ECU 90. The ECU stands for an electronic control unit. The ECU 90 includes a micro-computer as a main component. The micro-computer includes a CPU, a ROM, a RAM, a non-volatile memory, and an interface. The CPU realizes various functions by executing instructions, programs, or routines stored in the ROM.

<Internal Combustion Engine>

Figure 2:
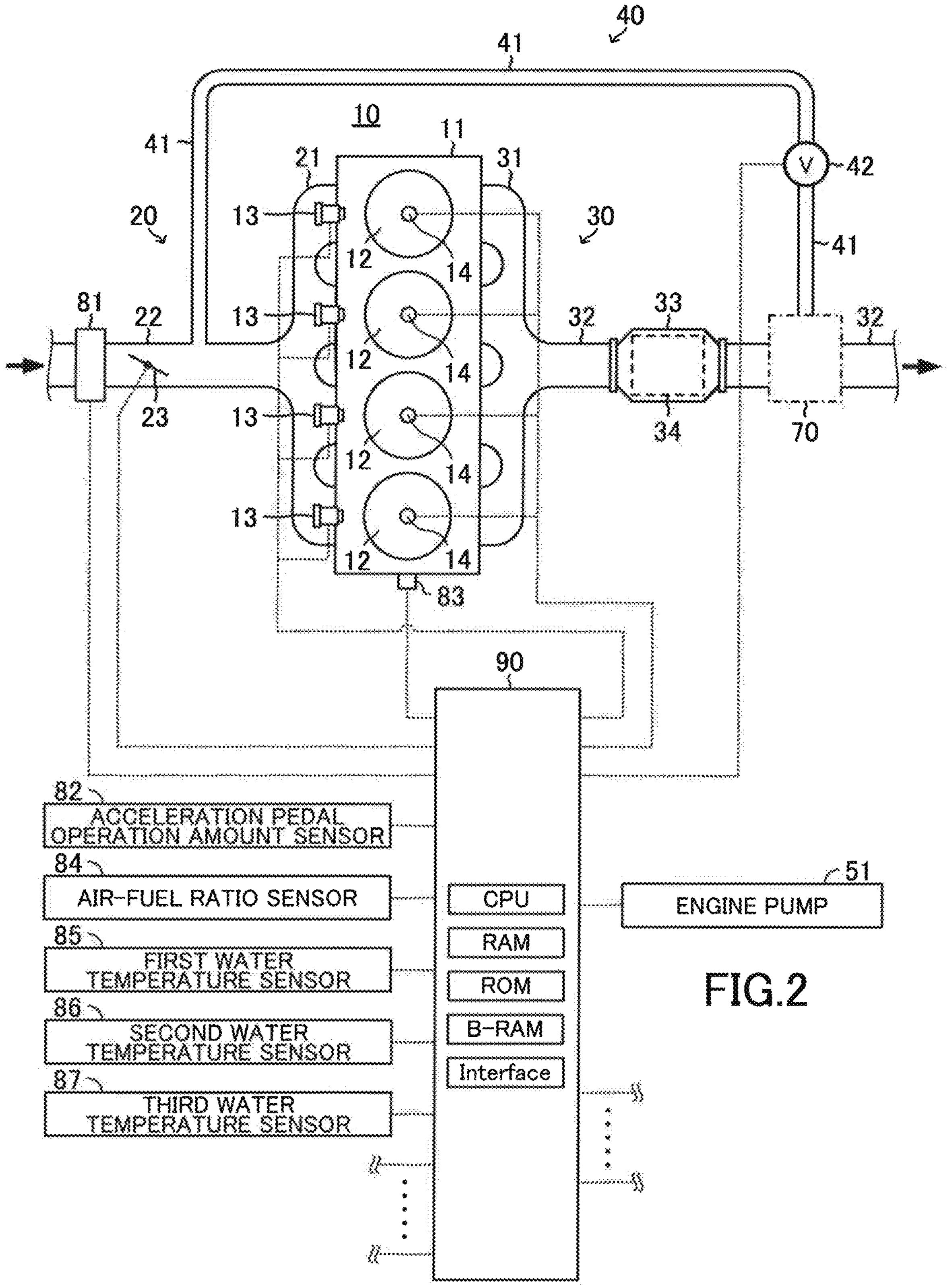
FIG. 2 is a view for showing the internal combustion engine, to which the control apparatus according to the embodiment of the invention is applied.

The embodiment control apparatus is applied to an internal combustion engine 10. As shown in FIG. 2, the engine 10 includes an engine body 11, an intake system 20, an exhaust system 30, an EGR apparatus 40, a cooling system 50, and an exhaust heat recovery cooler apparatus 70.

The engine 10 is a four-cycle piston-reciprocating spark-ignition multi-cylinder engine or a so-called gasoline engine. In this regard, the embodiment control apparatus may be applied to a four-cycle piston-reciprocating compression-ignition multi-cylinder engine or a so-called diesel engine.

Further, the embodiment control apparatus may be applied to the internal combustion engine of a so-called hybrid vehicle (HV) which is driven by the internal combustion engine and at least one electric motor as driving force sources. Furthermore, the embodiment control apparatus may be applied to the internal combustion engine of a so-called plug-in hybrid vehicle (PHV) which is driven by the internal combustion engine and at least one electric motor as the driving force sources and has a rechargeable battery which supplies electric power to the at least one motor and can be charged with the electric power from an outside electric power source.

Four combustion chambers 12, intake ports (not shown), and exhaust ports (not shown) are formed in the engine 10. The intake ports communicate with the respective combustion chambers 12. The exhaust ports communicate with the respective combustion chambers 12. The engine 10 includes intake valves (not shown), fuel injectors 13, exhaust valves (not shown), and ignition devices 14. The intake valves open and close the respective intake ports. The exhaust valves open and close the respective exhaust ports. The ignition devices 14 are provided, corresponding to the respective combustion chambers 12.

The embodiment control apparatus may be applied to the four-cycle piston-reciprocating spark-ignition multi-cylinder engine or a so-called direct-injection gasoline engine provided with the fuel injectors so as to inject the fuel directly into the respective combustion chambers.

The intake system 20 includes an intake manifold 21 and an intake pipe 22. The intake manifold 21 includes branch portions and a collection portion. The branch portions of the intake manifold 21 communicate with the respective combustion chambers 12 via the respective intake ports. The branch portions of the intake manifold 21 converge on the collection portion of the intake manifold 21. The intake pipe 22 is connected to the collection portion of the intake manifold 21. The intake manifold 21, the intake pipe 22, and the intake ports define an intake passage.

A throttle valve 23 is provided in the intake pipe 22. An air flow meter 81 is provided in the intake pipe 22 upstream of the throttle valve 23.

The throttle valve 23 is electrically connected to the ECU 90. The ECU 90 controls an amount of air drawn into the combustion chambers 12 by controlling an opening degree TA of the throttle valve 23. A flow rate of the air passing through the throttle valve 23 increases as the opening degree TA of the throttle valve 23 increases.

The air flow meter 81 is electrically connected to the ECU 90. The air flow meter 81 detects an amount Ga of the air passing through the air flow meter 81 and sends a signal representing the detected amount Ga. The ECU 90 acquires the amount Ga of the air passing through the air flow meter 81 as an intake air amount Ga, based on the signal sent from the air flow meter 81.

The exhaust system 30 includes an exhaust manifold 31 and an exhaust pipe 32. The exhaust manifold 31 includes branch portions and a collection portion. The branch portions of the exhaust manifold 31 communicate with the respective combustion chambers 12 via the respective exhaust ports. The branch portions of the exhaust manifold 31 converge on the collection portion of the exhaust manifold 31. The exhaust pipe 32 is connected to the collection portion of the exhaust manifold 31. The exhaust ports, the exhaust manifold 31, and the exhaust pipe 32 define an exhaust passage.

An exhaust gas purification apparatus 33 is provided in the exhaust pipe 32. So-called three-way catalyst 34 is contained in the exhaust gas purification apparatus 33.

The fuel injectors 13 are electrically connected to the ECU 90. The ECU 90 controls an amount Q of the fuel injected from each fuel injector 13 by controlling activations of the fuel injectors 13.

The ignition devices 14 are electrically connected to the ECU 90. The ECU 90 control activations of the ignition devices 14.

An acceleration pedal operation amount sensor 82 is electrically connected to the ECU 90. The acceleration pedal operation amount sensor 82 detects an operation amount AP of an acceleration pedal (not shown) and sends a signal representing the detected operation amount AP to the ECU 90. The ECU 90 acquires the operation amount AP of the acceleration pedal as an acceleration pedal operation amount AP, based on the signal sent from the acceleration pedal operation amount sensor 82. In addition, the ECU 90 acquires an engine load KL, based on the acceleration pedal operation amount AP.

A crank angle sensor 83 is electrically connected to the ECU 90. The crank angle sensor 83 outputs a pulse signal to the ECU 90 each time a crank shaft (not shown) of the engine 10 rotates by a predetermined angle. The ECU 90 acquires an engine speed NE, based on the pulse signals sent from the crank angle sensor 83.

An air-fuel ratio sensor 84 is electrically connected to the ECU 90. The air-fuel ratio sensor 84 is provided so as to detect an air-fuel ratio of an exhaust gas discharged from the combustion chambers 12. The air-fuel ratio sensor 84 detects the air-fuel ratio A/F of the exhaust gas discharged from the combustion chambers and sends a signal representing the detected air-fuel ratio A/F to the ECU 90. The ECU 90 acquires the air-fuel ratio A/F of the exhaust gas discharged from the combustion chambers 12 as an exhaust air-fuel ratio A/F, based on the signal sent from the air-fuel ratio sensor 84.

<Exhaust Heat Recovery Cooler Apparatus>

Figure 3A:
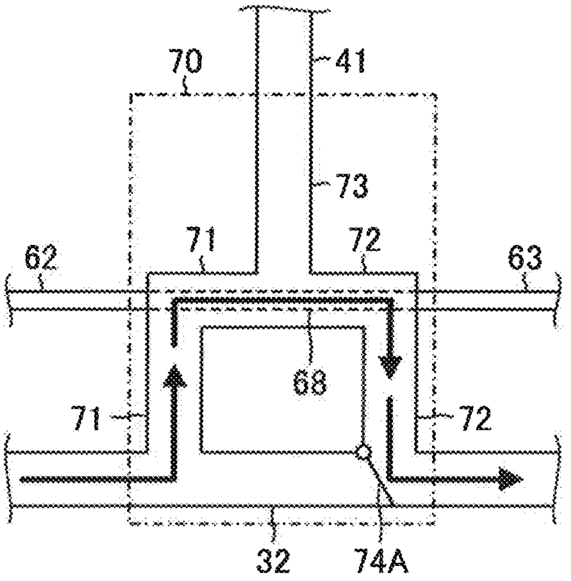
FIG. 3A is a view for showing a flow of an exhaust gas when an exhaust thermostatic valve of an exhaust heat recovery cooler apparatus shown in FIG. 2 is in a full open state, and an EGR control valve shown in FIG. 2 is in a full closed state.

The exhaust heat recovery cooler apparatus 70 is provided in the exhaust pipe 32 downstream of the exhaust gas purification apparatus 33. As shown in FIG. 3A, the exhaust heat recovery cooler apparatus 70 includes a first exhaust branch pipe 71, a second exhaust branch pipe 72, a third exhaust branch pipe 73, and an exhaust thermostatic valve 74A. The first exhaust branch pipe 71 branches off from the exhaust pipe 32 and is connected to the second and third exhaust branch pipes 72 and 73. The second exhaust branch pipe 72 is connected to the exhaust pipe 32 downstream of a position where the first exhaust branch pipe 71 branches off from the exhaust pipe 32. The third exhaust branch pipe 73 is connected to an EGR pipe 41 of the EGR apparatus 40. The exhaust thermostatic valve 74A is provided at a position where the second exhaust branch pipe 72 is connected to the exhaust pipe 32.

As shown FIG. 3A, an entirety of the exhaust gas discharged from the engine 10 and flowing through the exhaust pipe 32 is drawn into the first exhaust branch pipe 71 when (i) the exhaust thermostatic valve 74A is in a full open state, and (ii) an EGR control valve 42 of the EGR apparatus 40 is in a full closed state. Then, the entirety of the exhaust gas drawn into the first exhaust branch pipe 71 returns to the exhaust pipe 32 through the second exhaust branch pipe 72.

Figure 3B:
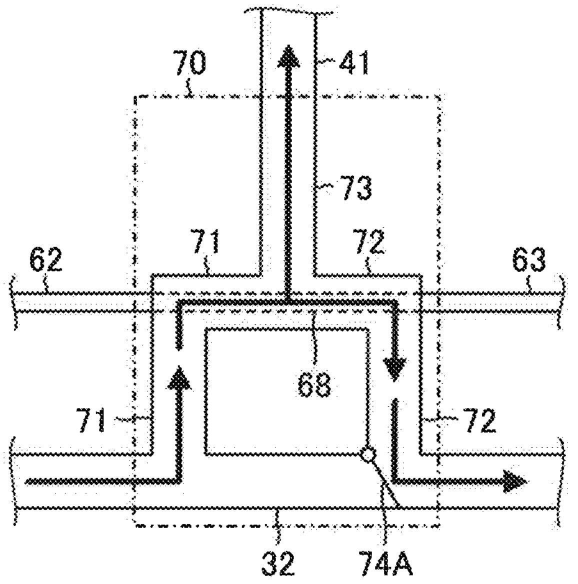
FIG. 3B is a view for showing the flow of the exhaust gas when the exhaust thermostatic valve in the full open state, and the EGR control valve is in an open state.

As shown in FIG. 3B, the entirety of the exhaust gas discharged from the engine 10 and flowing through the exhaust pipe 32 is drawn into the first exhaust branch pipe 71 when (i) the exhaust thermostatic valve 74A is in the full open state, and (ii) the EGR control valve 42 is in an open state. In this case, a part of the exhaust gas drawn into the first exhaust branch pipe 71 flows into the EGR pipe 41 through the third exhaust branch pipe 73. The remaining of the exhaust gas drawn into the first exhaust branch pipe 71 returns to the exhaust pipe 32 through the second exhaust branch pipe 72.

Figure 4A:
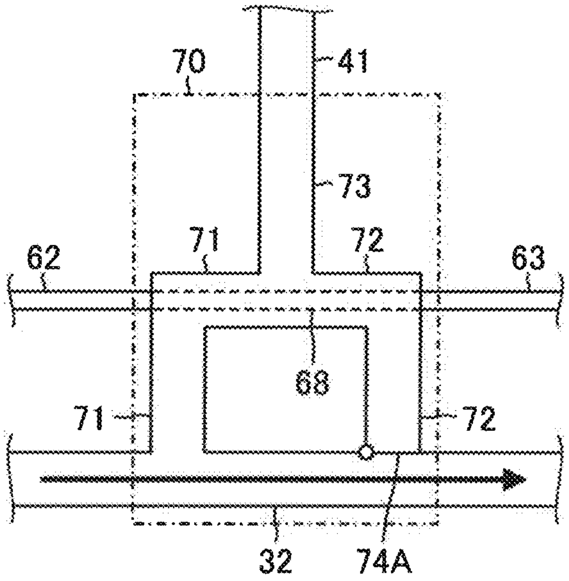
FIG. 4A is a view for showing the flow of the exhaust gas when the exhaust thermostatic valve is in a full closed state, and the EGR control valve is in a full closed state.

As shown in FIG. 4A, the exhaust gas discharged from the engine 10 and flowing through the exhaust pipe 32 is not drawn into the first exhaust branch pipe 71 and flows through the exhaust pipe 32 downstream when (i) the exhaust thermostatic valve 74A is in a full closed state, and (ii) the EGR control valve 42 is in the full closed state.

Figure 4B:
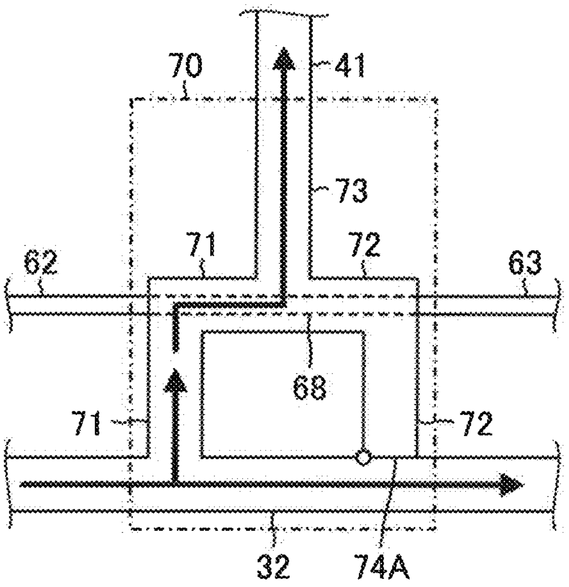
FIG. 4B is a view for showing the flow of the exhaust gas when the exhaust thermostatic valve is in the full closed state, and the EGR control valve is in the open state.

As shown in FIG. 4B, a part of the exhaust gas discharged from the engine 10 and flowing through the exhaust pipe 32 flows into the EGR pipe 41 through the first and third exhaust branch pipes 71 and 73 when (i) the exhaust thermostatic valve 74A is in the full closed state, and (ii) the EGR control valve 42 is in the open state. The remaining of the exhaust gas flows through the exhaust pipe 32 downstream.

Figure 5A:
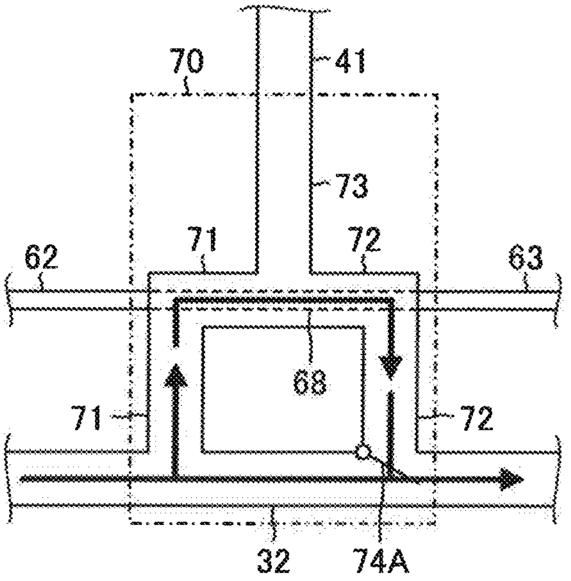
FIG. 5A is a view for showing the flow of the exhaust gas when the exhaust thermostatic valve is in a partial open state between the full open state and the full closed state, and the EGR control valve is in the full closed state.

As shown in FIG. 5A, a part of the exhaust gas discharged from the engine 10 and flowing through the exhaust pipe 32 is drawn into the first exhaust branch pipe 71 when (i) the exhaust thermostatic valve 74A is in a partial open state between the full open state and the full closed state, and (ii) the EGR control valve 42 is in the full closed state. The entirety of the exhaust gas drawn into the first exhaust branch pipe 71 returns to the exhaust pipe 32 through the second exhaust branch pipe 72. The exhaust gas not drawn into the first exhaust branch pipe 71 flows through the exhaust pipe 32 downstream.

Figure 5B:
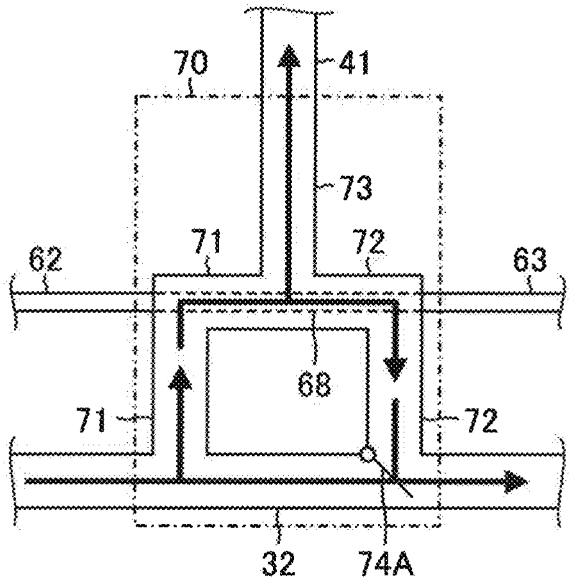
FIG. 5B is a view for showing the flow of the exhaust gas when the exhaust thermostatic valve is in the partial open state, and the EGR control valve is in the open state.

As shown in FIG. 5B, a part of the exhaust gas discharged from the engine 10 and flowing through the exhaust pipe 32 is drawn into the first exhaust branch pipe 71 when (i) the exhaust thermostatic valve 74A is in the partial open position, and (ii) the EGR control valve 42 is in the open state. A part of the exhaust gas drawn into the first exhaust branch pipe 71 flows into the EGR pipe 41 through the third exhaust branch pipe 73. The remaining of the exhaust gas drawn into the second exhaust branch pipe 72 returns to the exhaust pipe 32 through the second exhaust branch pipe 72. The exhaust gas not drawn into the first exhaust branch pipe 71 flows through the exhaust pipe 32 downstream.

The exhaust thermostatic valve 74A is a so-called thermostat. An opening degree Dex of the exhaust thermostatic valve 74A changes, depending on a temperature TW2 of cooling water flowing into a heat exchange water passage 68 of the cooling system 50. In particular, the exhaust thermostatic valve 74A is in the full open state as shown in FIG. 3A and FIG. 3B when the temperature TW2 of the cooling water flowing into the heat exchange water passage 68 is lower than a predetermined temperature TW2th. Thus, the opening degree Dex of the exhaust thermostatic valve 74A is a maximum opening degree Dex_max when the temperature TW2 of the cooling water flowing into the heat exchange water passage 68 is lower than the predetermined temperature TW2th. Hereinafter, the temperature TW2 of the cooling water flowing into the heat exchange water passage 68 will be referred to as "the second water temperature TW2", the predetermined temperature TW2th will be referred to as "the second water temperature threshold TW2th", and the opening degree Dex of the exhaust thermostatic valve 74A will be referred to as "the exhaust thermostatic valve opening degree Dex".

In this embodiment, the second water temperature threshold TW2th is set to a temperature higher than a first water temperature threshold TW1th described later.

The exhaust thermostatic valve 74A starts to be closed when the second water temperature TW2 reaches the second water temperature threshold TW2th. Thereby, the exhaust thermostatic valve 74A becomes a state between the full open state and the full closed position, i.e., becomes the partial open state as shown in FIG. 5A and FIG. 58B. In other words, the exhaust thermostatic valve opening degree Dex starts to decrease when the second water temperature TW2 reaches the second water temperature threshold TW2th.

The exhaust thermostatic valve opening degree Dex decreases as the second water temperature TW2 increases after the second water temperature TW2 reaches the second water temperature threshold TW2th. A flow rate of the exhaust gas drawn into the first exhaust branch pipe 71 from the exhaust pipe 32 decreases as the exhaust thermostatic valve opening degree Dex decreases.

Then, the exhaust thermostatic valve 74A becomes the full closed state as shown in FIG. 4A and FIG. 4B when the second water temperature TW2 reaches a certain temperature TW2dose higher than the second water temperature threshold TW2th. In other words, the exhaust thermostatic valve opening degree Dex becomes zero when the second water temperature TW2 reaches the temperature TW2dose. The exhaust thermostatic valve 74A is maintained at the full closed state while the second water temperature TW2 is higher than or equal to the temperature TW2dose. Hereinafter, the temperature TW2dose will be referred to as "the full closed water temperature TW2dose".

In this embodiment, the exhaust thermostatic valve 74A is configured to become the full closed state before an engine thermostatic valve 52 of the cooling system 50 described later starts to open.

<EGR Apparatus>

As shown in FIG. 2, the EGR apparatus 40 includes the EGR pipe 41 and the EGR control valve 42. As shown in FIG. 3A and FIG. 3B, one end of the EGR pipe 41 is connected to the third exhaust branch pipe 73. The other end of the EGR pipe 41 is connected to the intake pipe 22 downstream of the throttle valve 23.

As shown in FIG. 2, the EGR control valve 42. is provided in the EGR pipe 41. The exhaust gas cannot pass the EGR control valve 42 when the EGR control valve 42 is in the full closed state. On the other hand, the exhaust gas can pass the EGR control valve 42 when the EGR control valve 42 is in the open state.

The exhaust gas flowing through the exhaust pipe 32 is supplied to the intake pipe 22 through the first exhaust branch pipe 71, the third exhaust branch pipe 73, and the EGR pipe 41 by a negative pressure generated in the intake pipe 22 downstream of the throttle valve 23 when the EGR control valve 42 is in the open state. The exhaust gas supplied to the intake pipe 22 is drawn into the combustion chambers 12 through the intake manifold 21 and the intake ports.

The EGR control valve 42. is electrically connected to the ECU 90. The ECU 90 controls a flow rate EGegr of the exhaust gas supplied into the combustion chambers 12 by controlling an opening degree Degr of the EGR control valve 42. The flow rate EGegr of the exhaust gas passing the EGR control valve 42 increases as the opening degree Degr of the EGR control valve 42 increases. Hereinafter, the opening degree Degr of the EGR control valve 42 will be referred to as "the EGR control valve opening degree Degr", the exhaust gas passing the EGR control valve 42 will be referred to as "the EGR gas", and the flow rate EGegr of the EGR gas will be referred to as "the EGR gas flow rate GASegr".

<Cooling System>

As shown in FIG. 1, the cooling system 50 includes an electric water pump 51, the engine thermostatic valve 52, a radiator 53, and a cooling water circuit 60.

The cooling water circuit 60 is defined by an engine internal water passage 67, a radiator internal water passage 69, an internal water passage of the engine thermostatic valve 52, an internal water passage of the electric water pump 51, the heat exchange water passage 68 passing through the exhaust heat recovery cooler apparatus 70, first to fifth water passages 61 to 65, and a bypass water passage 66A.

The engine internal water passage 67 is a passage formed in the engine 10, through which the cooling water flows. The radiator internal water passage 69 is a passage formed in the radiator 53, through which the cooling water flows.

The first water passage 61 fluidically connects a cooling water discharge opening of the electric water pump 51 to an inlet of the engine internal water passage 67. The second water passage 62 is fluidically connects an outlet of the engine internal water passage 67 to an inlet of the heat exchange water passage 68. The third water passage 63 fluidically connects an outlet of the heat exchange water passage 68 to the internal water passage of the engine thermostatic valve 52. The fourth water passage 64 fluidically connects the internal water passage of the engine thermostatic valve 52 to an inlet of the radiator internal water passage 69. The fifth water passage 65 fluidically connects the radiator internal water passage 69 to a cooling water suction opening of the electric water pump 51. The bypass water passage 66A fluidically connects the internal water passage of the engine thermostatic valve 52 to the fifth water passage 65. Hereinafter, the electric water pump 51 will be referred to as "the engine pump 51".

The radiator internal water passage 69 is formed in the radiator 53 to transfer heat of the cooling water flowing through the radiator internal water passage 69 to the outside air.

As shown in FIG. 1, FIG. 3A, and FIG. 3B, the heat exchange water passage 68 is provided through the exhaust heat recovery cooler apparatus 70 to transfer heat of the exhaust gas flowing through the first and second exhaust branch pipes 71 and 72 of the exhaust heat recovery cooler apparatus 70 to the cooling water flowing through the heat exchange water passage 68.

The engine thermostatic valve 52 is a so-called thermostat. The engine thermostatic valve 52 is in a full closed state when a temperature TW3 of the cooling water flowing from the third water passage 63 into the internal water passage of the engine thermostatic valve 52 is lower than a predetermined temperature TW3th. In other words, an opening degree Deng of the engine thermostatic valve 52 is maintained zero when the temperature TW3 of the cooling water is lower than the predetermined temperature TW3th. Hereinafter, the temperature TW3 of the cooling water flowing from the third water passage 63 into the internal water passage of the engine thermostatic valve 52 will be referred to as "the third water temperature TW3", the predetermined temperature TW3th will be referred to as "the third water temperature threshold TW3th", and the opening degree Deng of the engine thermostatic valve 52 will be referred to as "the engine thermostatic valve opening degree Deng".

In this embodiment, the third water temperature threshold TW3th is set to a temperature higher than the first and second water temperature thresholds TW1th and TW2th.

An entirety of the cooling water flowing into the internal water passage of the engine thermostatic valve 52 flows into the bypass water passage 66A when the engine thermostatic valve 52 is in the full closed state.

The engine thermostatic valve 52 starts to open when the third water temperature TW3 reaches the third water temperature threshold TW3th. In other words, the engine thermostatic valve opening degree Deng starts to increase when the third water temperature TW3 reaches the third water temperature threshold TW3th. At least a part of the cooling water flowing into the internal water passage of the engine thermostatic valve 52 flows into the fourth water passage 64 when the engine thermostatic valve 52 opens.

The engine thermostatic valve opening degree Deng increases as the third water temperature TW3 increases when the third water temperature TW3 is equal to or higher than the third water temperature threshold TW3th. The flow rate of the cooling water flowing from the internal water passage of the engine thermostatic valve 52 into the fourth water passage 64 increases as the engine thermostatic valve opening degree Deng increases.

The engine thermostatic valve 52 becomes a full open state when the third water temperature TW3 reaches a certain temperature TW3open higher than the third water temperature threshold TW3th. In other words, the engine thermostatic valve opening degree Deng becomes a maximum opening degree when the third water temperature TW3 reaches the temperature TW3open. Then, the engine thermostatic valve 52 is maintained at the full open state while the third water temperature TW3 is equal to or higher than the temperature TW3open. The entirety of the cooling water flowing into the internal water passage of the engine thermostatic valve 52 flows into the fourth water passage 64 when the engine thermostatic valve 52 is in the full open state. Hereinafter, the temperature TW3open will be referred to as "the full open water temperature TW3open".

The engine pump 51 is electrically connected to the ECU 90. The ECU 90 controls the flow rate of the cooling water discharged from the engine pump 51 by controlling an activation of the engine pump 51.

A first water temperature sensor 85, a second water temperature sensor 86, and a third water temperature sensor 87 are provided in the cooling water circuit 60.

The first water temperature sensor 85 is electrically connected to the ECU 90. The first water temperature sensor 85 is provided so as to detect the temperature TW1 of the cooling water just after flowing into the second water passage 62 from the engine internal water passage 67. The first water temperature sensor 85 sends a signal representing the detected temperature TW1 of the cooling water to the ECU 90. The ECU 90 acquires the temperature TW1 of the cooling water just after flowing into the second water passage 62 from the engine internal water passage 67 as a first water temperature TW1, based on the signal sent from the first water temperature sensor 85. The first water temperature TW1 correlates with a temperature Teng of the engine 10.

The second water temperature sensor 86 is electrically connected to the ECU 90. The second water temperature sensor 86 is provided so as to detect the temperature TW2 of the cooling water just before flowing into the heat exchange water passage 68 from the second water passage 62. The second water temperature sensor 86 sends a signal representing the detected temperature TW2 of the cooling water to the ECU 90. The ECU 90 acquires the temperature TW2 of the cooling water just before flowing into the heat exchange water passage 68 from the second water passage 62 as the second water temperature TW2, based on the signal sent from the second water temperature sensor 86.

In this embodiment, the first water temperature TW1 is the temperature of the cooling water just after flowing into the second water passage 62 from the engine internal water passage 67, and the second water temperature TW2 is the temperature of the cooling water just before flowing into the heat exchange water passage 68 from the second water passage 62. Therefore, the second water temperature TW2 is generally equal to the first water temperature TW1.

It should be noted that the second water temperature sensor 86 may be provided so as to detect the temperature of the cooling water just after flowing into the heat exchange water passage 68 from the second water passage 62.

The third water temperature sensor 87 is electrically connected to the ECU 90. The third water temperature sensor 87 is provided so as to detect the temperature TW3 of the cooling water just before flowing into the internal water passage of the engine thermostatic valve 52 from the third water passage 63. The third water temperature sensor 87 sends a signal representing the detected temperature TW3 of the cooling water to the ECU 90. The ECU 90 acquires the temperature TW3 of the cooling water just before flowing into the internal water passage of the engine thermostatic valve 52 from the third water passage 63 as the third water temperature TW3, based on the signal sent from the third water temperature sensor 87.

<Summary of Operation of Embodiment Control Apparatus>

Next, a summary of an operation of the embodiment control apparatus will be described, using an example shown in FIG. 6.

The embodiment control apparatus is configured to execute an EGR control to supply the exhaust gas flowing through the exhaust pipe 32 into the intake pipe 22 through the first exhaust branch pipe 71, the third exhaust branch pipe 73, and the EGR pipe 41 by controlling the EGR control valve opening degree Degr so as to control the EGR control valve 42 in the open state.

Figure 6:
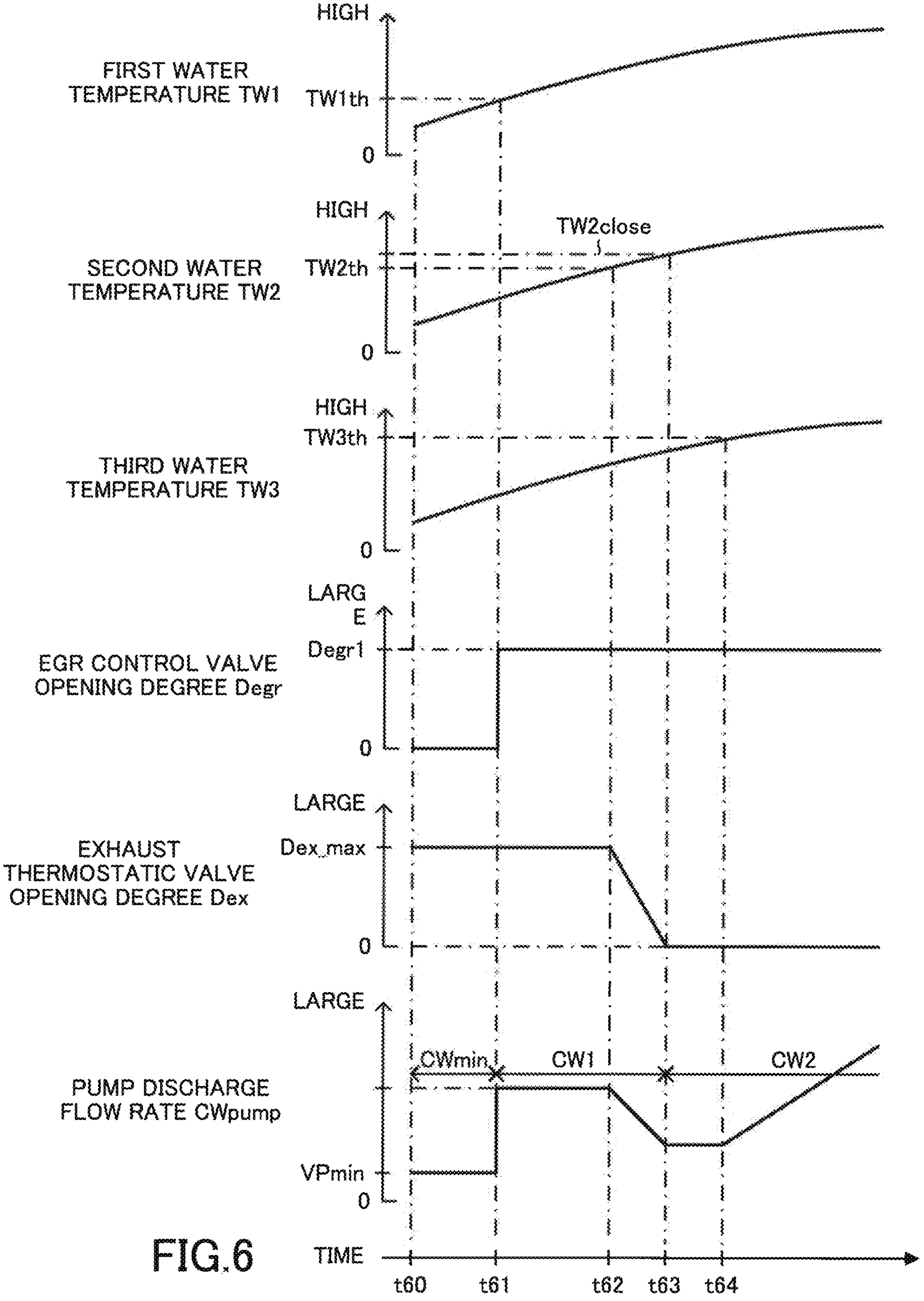
FIG. 6 is a view for showing a time chart used for describing an operation of the control apparatus according to the embodiment of the invention.

FIG. 6 shows an example in which the temperature Teng of the engine 10 gradually increases after an operation of the engine 10 is started. In addition, in the example shown in FIG. 6, the EGR control valve opening degree Degr is maintained at a constant opening degree Degr1 after an execution of the EGR control is started. Hereinafter, the temperature Teng of the engine 10 will be referred to as "the engine temperature Teng".

<Engine Start to EGR Control Start>

The embodiment control apparatus starts the operation of the engine 10 by starting to cause the fuel injectors 13 to inject the fuel and starting the activations of the ignition devices 14 when an execution of a process to start the operation of the engine 10 is requested.

The embodiment control apparatus controls the opening degree TA of the throttle valve 23, based on the engine speed NE and the engine load KL while the engine 10 is operated. For example, the embodiment control apparatus increases the opening degree TA of the throttle valve 23 as (i) the engine speed NE increases, and (ii) the engine load KL increases while the engine 10 is operated.

Further, the embodiment control apparatus controls the amount Q of the fuel injected from each fuel injector 13, based on the intake air amount Ga while the engine 10 is operated. For example, the embodiment control apparatus controls the amount Q of the fuel injected from each fuel injector 13, based on the intake air amount Ga such that the air-fuel ratio A/F in each combustion chamber 12 is controlled to a target air-fuel ratio A/Ftgt. In this embodiment, the embodiment control apparatus acquires the exhaust air-fuel ratio A/F as the air-fuel ratio A/F in the combustion chamber 12.

The embodiment control apparatus starts the execution of the EGR control when the first water temperature TW1 reaches the first water temperature threshold TW1th. In the example shown in FIG. 6, the first water temperature TW1 is lower than the first water temperature threshold TW1th at a point of time t60 when the operation of the engine 10 is started. Therefore, the embodiment control apparatus does not start the execution of the EGR control at the point of time t60 when the operation of the engine 10 is started. Thus, the embodiment control apparatus controls the EGR control valve opening degree Degr to control the EGR control valve 42 in the full closed state.

In addition, as show in FIG. 6, the second and third water temperatures TW2 and TW3 are lower than the second and third water temperature thresholds TW2th and TW3th, respectively at the point of time t60 when the operation of the engine 10 is started. Thus, at the point of time t60, the exhaust thermostatic valve 74A is in the full open state, and the engine thermostatic valve 52 is in the full closed state.

In addition, As shown in FIG. 6, the embodiment control apparatus starts the activation of the engine pump 51 at the point of time t60 when the operation of the engine 10 is started. At the point of time t60, the embodiment control apparatus sets a minimum flow rate CWmin as a target CWtgt of a flow rate CWpump of the cooling water discharged from the engine pump 51. The embodiment control apparatus controls the activation of the engine pump 51 to control the flow rate CWpump to the target CWtgt Hereinafter, the target CWtgt will be referred to as "the target discharge flow rate CWtgt", and the flow rate CWpump will be referred to as "the pump discharge flow rate CWpump".

Thereby, a flow rate CWheat of the cooling water supplied to the heat exchange water passage 68 is controlled to the minimum flow rate CWmin. Hereinafter, the flow rate CWheat will be referred to as "the heat exchange cooling water flow rate CWheat".

In this embodiment, the minimum flow rate CWmin is set to the pump discharge flow rate CWpump capable of warming the engine 10 promptly as possible. In other words, the minimum flow rate CWmin is set to the pump discharge flow rate CWpump capable of increasing the engine temperature Teng at a large increase rate as possible.

The exhaust gas flows as shown in FIG. 3A until the first water temperature TW1 reaches the first water temperature threshold TW1th after the operation of the engine 10 is started. A flow of the exhaust gas shown in FIG. 3A is described above.

Figure 7:
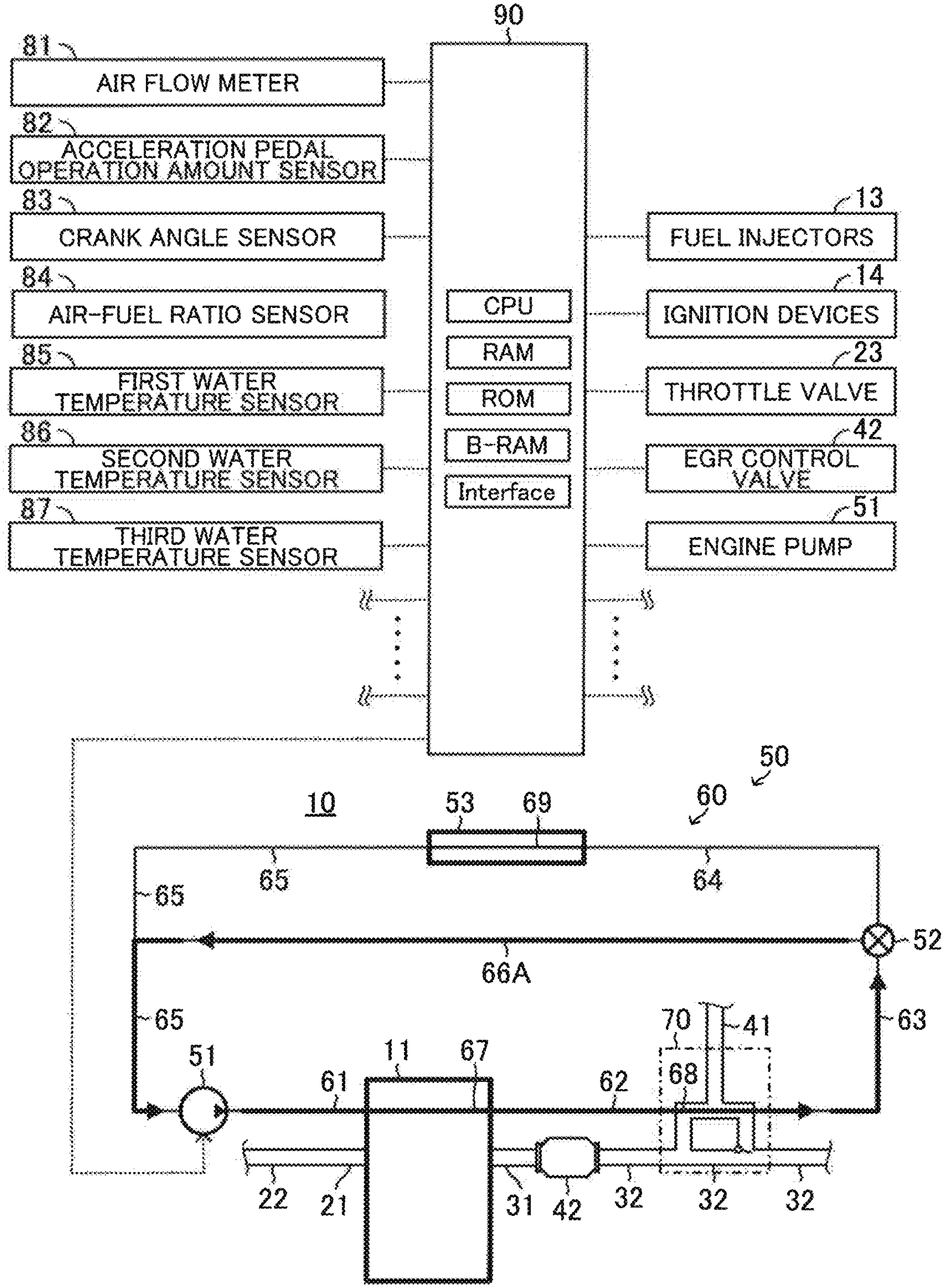
FIG. 7 is a view similar to the view shown in FIG. 1 and which shows a flow of cooling water when the exhaust thermostatic valve is in the full closed state.

In addition, the cooling water flows as shown in FIG. 7 until the first water temperature TW1 reaches the first water temperature threshold TW1th after the operation of the engine 10 is started. A flow of the cooling water shown in FIG. 7 is as follows.

The cooling water discharged from the engine pump 51 flows into the engine internal water passage 67 through the first water passage 61. The cooling water flows through the engine internal water passage 67 and then, flows into the heat exchange water passage 68 through the second water passage 62. The cooling water flows through the heat exchange water passage 68 and then, is suctioned into the engine pump 51 through the third water passage 63, the internal water passage of the engine thermostatic valve 52, the bypass water passage 66A, and the fifth water passage 65.

The exhaust gas flowing into the first exhaust branch pipe 71 is cooled by the cooling water flowing through the heat exchange water passage 68 while (i) the exhaust gas flows through the first and second exhaust branch pipes 71 and 72 as shown in FIG. 3A, and (ii) the cooling water flow as shown in FIG. 7. In other words, the heat of the exhaust gas flowing into the first exhaust branch pipe 71 is transferred to the cooling water flowing through the heat exchange water passage 68 while the exhaust gas flows through the first and second exhaust branch pipes 71 and 72. Thereby, the temperature of the cooling water flowing through the heat exchange water passage 68 increases. The cooling water having the increased temperature flows into the engine internal water passage 67 without flowing through the radiator 53. As a result, the engine temperature Teng is increased at a relatively large increase rate.

Therefore, the exhaust heat recovery cooler apparatus 70 performs an exhaust heat recovery function until the execution of the EGR control is started. The exhaust heat recovery function is to draw the exhaust gas, which is discharged from the combustion chambers 12 to the exhaust pipe 32, into the exhaust heat recovery cooler apparatus 70, exchange the heat between the drawn exhaust gas and the cooling water to transfer the heat of the drawn exhaust gas to the cooling water, and return the drawn exhaust gas, which has transferred the heat to the cooling water, to the exhaust pipe 32.

<EGR Control Start to Exhaust Thermostatic Valve Full Closed>

As shown in FIG. 6, the embodiment control apparatus starts the execution of the EGR control to control an EGR rate Regr to a target EGR rate Regr_tgt at a point of time t61 when the first water temperature TW1 reaches the first water temperature threshold TW1th. The EGR rate Regr is a ratio of an amount of the EGR gas relative to a total amount of gas drawn into the combustion chambers 12, and the target EGR rate Regr_tgt is a target of the EGR rate Regr.

The EGR rate Regr suitable for the operation of the engine 10 depends on a combination of the engine speed NE and the engine load KL. In this embodiment, the EGR rates Regr suitable for the operation of the engine 10 are acquired as base EGR rates Regr_base by experiments as to every combination of the engine speed NE and the engine load KL The acquired base EGR rates Regr_base are stored in the memory or the ROM of the embodiment control apparatus in the form of a look-up table MapRegr_base(NE,KL) for acquiring the base EGR rate Regr_base, based on the engine speed NE and the engine load KL.

The embodiment control apparatus acquires the base EGR rate Regr_base by applying the current engine speed NE and the current engine load KL to the look-up table MapRegr_base(NE,KL) while the embodiment control apparatus executes the EGR control. Then, the embodiment control apparatus sets the acquired base EGR rate Regr_base as the target EGR rate Regr_tgt. The embodiment control apparatus controls the EGR control valve opening degree Degr to control the EGR rate Regr to the target EGR rate Regr_tgt.

The exhaust gas flows as shown in FIG. 3B until the exhaust thermostatic valve 74A starts to be closed after the execution of the EGR control is started. The flow of the exhaust gas shown in FIG. 3B is described above.

In addition, the cooling water flows as shown in FIG. 7 until the exhaust thermostatic valve 74A starts to be closed after the execution of the EGR control is started. The flow of the cooling water shown in FIG. 7 is described above.

The exhaust gas flows through the first exhaust branch pipe 71 and is cooled by the cooling water flowing through the heat exchange water passage 68 while (i) the exhaust gas flows as shown in FIG. 3B, and (ii) the cooling water flows as shown in FIG. 7. A part of the cooled exhaust gas flows into the EGR pipe 41 through the third exhaust branch pipe 73. The remaining of the cooled exhaust gas flows through the second exhaust branch pipe 72 and is further cooled by the cooling water flowing through the heat exchange water passage 68.

Therefore, the exhaust heat recovery cooler apparatus 70 performs an exhaust gas supply function in addition to the exhaust heat recovery function after the execution of the EGR control is started. The exhaust gas supply function is to draw the exhaust gas, which is discharged from the combustion chambers 12 to the exhaust pipe 32, into the exhaust heat recovery cooler apparatus 70, exchange the heat between the drawn exhaust gas and the cooling water to transfer the heat of the drawn exhaust gas to the cooling water, and supply the drawn exhaust gas, which has transferred the heat to the coding water, to the EGR apparatus 40.

A part of the exhaust gas flowing into the first exhaust branch pipe 71 is supplied to the combustion chambers 12 as the EGR gas through the EGR pipe 41, the intake pipe 22, the intake manifold 21, and the intake ports when the EGR control is executed. In this regard, there is an optimal temperature TGegr_opt as a temperature TGegr of the EGR gas. Hereinafter, the temperature TGegr will be referred to "the EGR gas temperature TGegr".

In this regard, as shown in FIG. 6, the second water temperature TW2 is lower than the second water temperature threshold TW2th at the point of time t61 when the execution of the EGR control is started. Therefore, at the point of time t61, the exhaust thermostatic valve 74A is in the full open state. As a result, the entirety of the exhaust gas discharged from the combustion chambers 12 is drawn into the first exhaust branch pipe 71. Therefore, a flow rate GASin of the exhaust gas drawn into the first exhaust branch pipe 71 is large. Hereinafter, the flow rate GASin will be referred to as “the branch exhaust gas flow rate GASin”.

If (i) the branch exhaust gas flow rate GASin is large, and (ii) the minimum flow rate CWmin is set as the target discharge flow rate CWtgt, the flow rate of the cooling water supplied to the heat exchange water passage 68 is too small. In this case, the exhaust heat recovery cooler apparatus 70 may not decrease the EGR gas temperature TGegr to the optimal temperature TGegr_opt.

Further, the branch exhaust gas flow rate GASin is greater than the EGR gas flow rate GASegr. In this case, the EGR gas temperature TGegr may not be decreased to the optimal temperature TGegr_opt even when the target discharge flow rate CWtgt is set to the pump discharge flow rate CWpump capable of decreasing the temperature of the exhaust gas having a flow rate equal to the EGR gas flow rate GASegr to the optimal temperature TGegr_opt.

In addition, the exhaust thermostatic valve 74A is in the open state until the second water temperature TW2 reaches the full closed water temperature TW2dose after the execution of the EGR control is started. In this case, the branch exhaust gas flow rate GASin is greater than the EGR gas flow rate GASegr. Thus, the flow rate of the cooling water supplied to the heat exchange water passage 68 is too small if the minimum flow rate CWmin is set as the target discharge flow rate CWtgt until the second water temperature TW2 reaches the full closed water temperature TW2dose after the execution of the EGR control is started. As a result, the exhaust heat recovery cooler apparatus 70 may not decrease the EGR gas temperature TGegr to the optimal temperature TGegr_opt. In this case, the EGR gas temperature TGegr may not be decreased to the optimal temperature TGegr_opt even when the target discharge flow rate CWtgt is set to the pump discharge flow rate CWpump capable of decreasing the temperature of the exhaust gas having the flow rate equal to the EGR gas flow rate GASegr to the optimal temperature TGegr_opt.

In general, an ability of the exhaust heat recovery cooler apparatus 70 requested to cool the exhaust gas drawn into the first exhaust branch pipe 71 increases as (i) the branch exhaust gas flow rate GASin increases, and (ii) the temperature of the exhaust gas discharged from the combustion chambers 12 increases when (i) the EGR control is executed, and (ii) the exhaust thermostatic valve 74A is in the open state. Hereinafter, the ability of the exhaust heat recovery cooler apparatus 70 requested to cool the exhaust gas drawn into the first exhaust branch pipe 71 will be referred to as “the cooling ability requested to the exhaust heat recovery cooler apparatus 70” or “the requested cooling ability of the exhaust heat recovery cooler apparatus 70”, and the temperature of the exhaust gas discharged from the combustion chambers 12 will be referred to as “the engine exhaust gas temperature Tex_eng”.

The branch exhaust gas flow rate GASin increases as (i) the engine speed NE increases, (ii) the engine load KL increases, (iii) the exhaust thermostatic valve opening degree Dex increases, and (iv) the EGR control valve opening degree Degr increases. The engine exhaust temperature Tex_eng increases as (i) the engine speed NE increases, and (ii) the engine load KL increases.

Accordingly, in this embodiment, the pump discharge flow rates CWpump capable of achieving the requested cooling ability of the exhaust heat recovery cooler apparatus 70 under the condition that (i) the EGR control is executed, and (ii) the exhaust thermostatic valve 74A is in the open state, are acquired as base discharge flow rates CW1 by the experiments as to every combination of (i) the engine speed NE, (ii) the engine load KL, (iii) the exhaust thermostatic valve opening degree Dex, and (iv) the EGR control valve opening degree Degr.

The acquired base discharge flow rates CW1 are stored in the memory or the ROM of the embodiment control apparatus in the form of a look-up table MapCW1(NE,KL,Dex,Degr) for acquiring the base discharge flow rate CW1, based on (i) the engine speed NE, (ii) the engine load KL, (iii) the exhaust thermostatic valve opening degree Dex, and (iv) the EGR control valve opening degree Degr. The base discharge flow rate CW1 acquired from the look-up table MapCW1(NE,KL,Dex,Degr) increases as (i) the engine speed NE increases, (ii) the engine load KL increases, (iii) the exhaust thermostatic valve opening degree Dex increases, and (iv) the EGR control valve opening degree Degr increases.

In this embodiment, the base discharge flow rate CW1 acquired from the look-up table MapCW1(NE,KL,DexD-eDegr) is greater than the minimum flow rate CWmin. Also, the base discharge flow rate CW1 acquired from the look-up table MapCW1(NE,KL,Dex,DeDegr) is greater than the pump discharge flow rate CWpump capable of decreasing the temperature of the exhaust gas having the flow rate equal to the EGR gas flow rate GASegr to the optimal temperature TGegr_opt.

In addition, the base discharge flow rate CW1 acquired from the look-up table MapCW1(NE,KL,Dex,Degr) is greater than a base discharge flow rate CW2 acquired from a look-up table MapCW2(NE,KL,Degr) described later if the engine speed NE, the engine load KL, and the EGR gas flow rate GASegr are the same.

The embodiment control apparatus acquires the base discharge flow rate CW1 by applying the current engine speed NE, the current engine load KL, the current exhaust thermostatic valve opening degree Dex, and the current EGR control valve opening degree Degr to the look-up table MapCW1(NE,KL,Dex,Degr). Then, the embodiment control apparatus sets the acquired base discharge flow rate CW1 as the target discharge flow rate CWtgt. The embodiment control apparatus controls the activation of the engine pump 51 to control the pump discharge flow rate CWpump to the target discharge flow rate CWtgt (=CW1).

Thereby, the pump discharge flow rate CWpump is increased to the flow rate CW1, depending on the branch exhaust gas flow rate GASin when (i) the exhaust thermostatic valve 74A is in the full open state, and (ii) the execution of the EGR control is started. As a result, the heat exchange cooling water flow rate CWheat increases to the flow rate CW1. Thus, it can be ensured to decrease the EGR gas temperature TGegr to the optimal temperature TGegr_opt when (i) the execution of the EGR control is started, and (ii) the exhaust thermostatic valve 74A is in the full open state.

As shown in FIG. 6, the exhaust thermostatic valve 74A starts to be closed at a point of time t62 when the second water temperature TW2 reaches the second water temperature threshold TW2th. In this case, the exhaust gas flows as shown in FIG. 58B until the exhaust thermostatic valve 74A becomes the full closed state after the exhaust thermostatic valve 74A starts to be closed. The flow of the exhaust gas shown in FIG. 5B is described above.

In addition, the cooling water flows as shown in FIG. 7 until the exhaust thermostatic valve 74A becomes the full closed state after the exhaust thermostatic valve 74A starts to be closed. The flow of the cooling water shown in FIG. 7 is described above.

The exhaust gas flows through the first exhaust branch pipe 71 and is cooled by the cooling water flowing through the heat exchange water passage 68 when (i) the exhaust gas flows as shown in FIG. 5B, and (ii) the cooling water flows as shown in FIG. 7. A part of the cooled exhaust gas flows into the EGR pipe 41 through the third exhaust branch pipe 73. The remaining of the cooled exhaust gas flows through the second exhaust branch pipe 72 and is further cooled by the cooling water flowing through the heat exchange water passage 68.

Therefore, the exhaust heat recovery cooler apparatus 70 performs the exhaust gas supply function and the exhaust heat recovery function until the exhaust thermostatic valve 74A becomes the full closed state after the execution of the EGR control is started.

The exhaust thermostatic valve opening degree Dex decreases as the second water temperature TW2 increases until the second water temperature TW2 reaches the full closed water temperature TW2close after the exhaust thermostatic valve 74A starts to be closed. The base discharge flow rate CW1 acquired from the look-up table MapCW1(NE,KL,Dex,Degr) decreases as the exhaust thermostatic valve opening degree Dex decreases. Therefore, the exhaust thermostatic valve opening degree Dex decreases after the execution of the EGR control is started. As a result, the pump discharge flow rate CWpump decreases as the branch exhaust gas flow rate GASin decreases. Thus, the EGR gas can be prevented from being excessively cooled.

In addition, the exhaust thermostatic valve opening degree Dex is maintained at the maximum opening degree Dex_max until the second water temperature TW2 reaches the second water temperature threshold TW2th. Then, the exhaust thermostatic valve opening degree Dex decreases as the second water temperature TW2 increases until the second water temperature TW2 reaches the full closed water temperature TW2close after the second water temperature TW2 exceeds the second water temperature threshold TW2th. That is, the second water temperature TW2 correlates with the exhaust thermostatic valve opening degree Dex. Accordingly, the embodiment control apparatus uses a correlation between the exhaust thermostatic valve opening degree Dex and the second water temperature TW2 to estimate the exhaust thermostatic valve opening degree Dex. In particular, the embodiment control apparatus estimates the exhaust thermostatic valve opening degree Dex, based on the second water temperature TW2.

As described above, the second water temperature TW2 correlates with the exhaust thermostatic valve opening degree Dex. Therefore, the base discharge flow rates CW1 may be stored in the memory or the ROM of the embodiment control apparatus in the form of a look-up table MapCW1(NE,KL,TW2,Degr) for acquiring the base discharge flow rate CW1, based on the engine speed NE, the engine load KL, the second water temperature TW2, and the EGR control valve opening degree Degr. In this case, the embodiment control apparatus acquires the base discharge flow rate CW1 by applying the current engine speed NE, the current engine load KL, the current second water temperature TW2, and the current EGR control valve opening degree Degr to the look-up table MapCW1(NE,KL,TW2,Degr) until the second water temperature TW2 reaches the full closed water temperature TW2close after the embodiment control apparatus starts the execution of the EGR control. Then, the embodiment control apparatus sets the acquired base discharge flow rate CW1 as the target discharge flow rate CWtgt.

<Exhaust Thermostatic Valve Full Closed to Engine Thermostatic Valve Open>

As shown in FIG. 6, the exhaust thermostatic valve 74A becomes the full closed state at a point of time t63 when the second water temperature TW2 reaches the full closed water temperature TW2close.

The exhaust gas flows as shown in FIG. 48 until the engine thermostatic valve 52 starts to open after the exhaust thermostatic valve 74A becomes the full closed state. The flow of the exhaust gas shown in FIG. 48 is described above.

In addition, the cooling water flows as shown in FIG. 7 until the engine thermostatic valve 52 starts to open after the exhaust thermostatic valve 74A becomes the full closed state. The flow of the cooling water shown in FIG. 7 is described above.

The exhaust gas flows through the first exhaust branch pipe 71 and is cooled by the cooling water flowing through the heat exchange water passage 68 when (i) the exhaust gas flows as shown in FIG. 4B, and (ii) the cooling water flows as shown in FIG. 7. The entirety of the cooled exhaust gas flows into the EGR pipe 41 through the third exhaust branch pipe 73.

Therefore, the exhaust heat recovery cooler apparatus 70 performs the exhaust gas supply function until the engine thermostatic valve 52 starts to open after the exhaust thermostatic valve 74A becomes the full closed state.

In general, the cooling ability requested to the exhaust heat recovery cooler apparatus 70 increases as (i) the EGR gas flow rate GASegr increases, and (ii) the engine exhaust temperature Tex_eng increases after the exhaust thermostatic valve 74A becomes the full closed state. The EGR gas flow rate GASegr increases as the EGR control valve opening degree Degr increases. In addition, the engine exhaust temperature Tex_eng increases as (i) the engine speed NE increases, and (ii) the engine load KL increases.

Accordingly, in this embodiment, the pump discharge flow rates CWpump capable of achieving the requested cooling ability of the exhaust heat recovery cooler apparatus 70 under the condition that (i) the EGR control is executed, and (ii) the exhaust thermostatic valve 74A is in the full closed state, are acquired as base discharge flow rates CW2 by the experiments as to every combination of (i) the engine speed NE, (ii) the engine load KL, and (iii) the EGR control valve opening degree Degr.

The acquired base discharge flow rates CW2 are stored in the memory or the ROM of the embodiment control apparatus in the form of a look-up table MapCW2(NE,KL,Degr) for acquiring the base discharge flow rate CW2, based on the engine speed NE, the engine load KL, and the EGR control valve opening degree Degr. The base discharge flow rate CW2 acquired from the look-up table MapCW2(NE,KL,Degr) increases as (i) the engine speed NE increases, (ii) the engine load KL increases, and (iii) the EGR control valve opening degree Degr increases.

The embodiment control apparatus acquires the base discharge flow rate CW2 by applying the current engine speed NE, the current engine load KL, and the current EGR control valve opening degree Degr to the look-up table MapCW2(NE,KL,Degr) when (i) the embodiment control apparatus executes the EGR control, and (ii) the exhaust thermostatic valve 74A is in the full closed state. Then, the embodiment control apparatus sets the acquired base discharge flow rate CW2 as the target discharge flow rate CWtgt. The embodiment control apparatus controls the activation of the engine pump 51 to control the pump discharge flow rate CWpump to the target discharge flow rate CWtgt (=CW2).

Thereby, it can be ensured to decrease the EGR gas temperature TGegr to the optimal temperature TGegr_opt when (i) the EGR control is executed, and (ii) the exhaust thermostatic valve 74A is in the full closed state.

It should be noted that the embodiment control apparatus may be configured to set the target discharge flow rate CWtgt, depending on the engine temperature Teng when (i) the EGR control is executed, and (ii) the exhaust thermostatic valve 74A is in the full closed state. In this case, the pump discharge flow rates CWpump capable of achieving the requested cooling ability of the exhaust heat recovery cooler apparatus 70 under the condition that (i) the EGR control is executed, and (ii) the exhaust thermostatic valve 74A is in the full closed state, are acquired as the base discharge flow rates CW2 by the experiments as to every first water temperature TW1 correlating with the engine temperature Teng.

The acquired base discharge flow rates CW2 are stored in the memory or the ROM of the embodiment control apparatus in the form of a look-up table MapCW2(TW1) for acquiring the base discharge flow rate CW2, based on the first water temperature TW1. The base discharge flow rate CW2 acquired from the look-up table MapCW2(TW1) increases as the first water temperature TW1 increases.

The embodiment control apparatus acquires the base discharge flow rate CW2 by applying the current first water temperature TW1 to the look-up table MapCW2(TW1) when (i) the embodiment control apparatus executes the EGR control, and (ii) the exhaust thermostatic valve 74A is in the full closed state. Then, the embodiment control apparatus sets the acquired base discharge flow rate CW2 as the target discharge flow rate CWtgt. The embodiment control apparatus controls the activation of the engine pump 51 to control the pump discharge flow rate CWpump to the target discharge flow rate CWtst (=CW2).

<Engine Thermostatic Valve Open to Engine Thermostatic Valve Full Open>

As shown in FIG. 6, the engine thermostatic valve 52 starts to open at a point of time t64 when the third water temperature TW3 reaches the third water temperature threshold TW3th.

The exhaust gas flows as shown in FIG. 48 until the engine thermostatic valve 52 becomes the full open state after the engine thermostatic valve 52 starts to open. The flow of the exhaust gas shown in FIG. 48 is described above.

Figure 8:
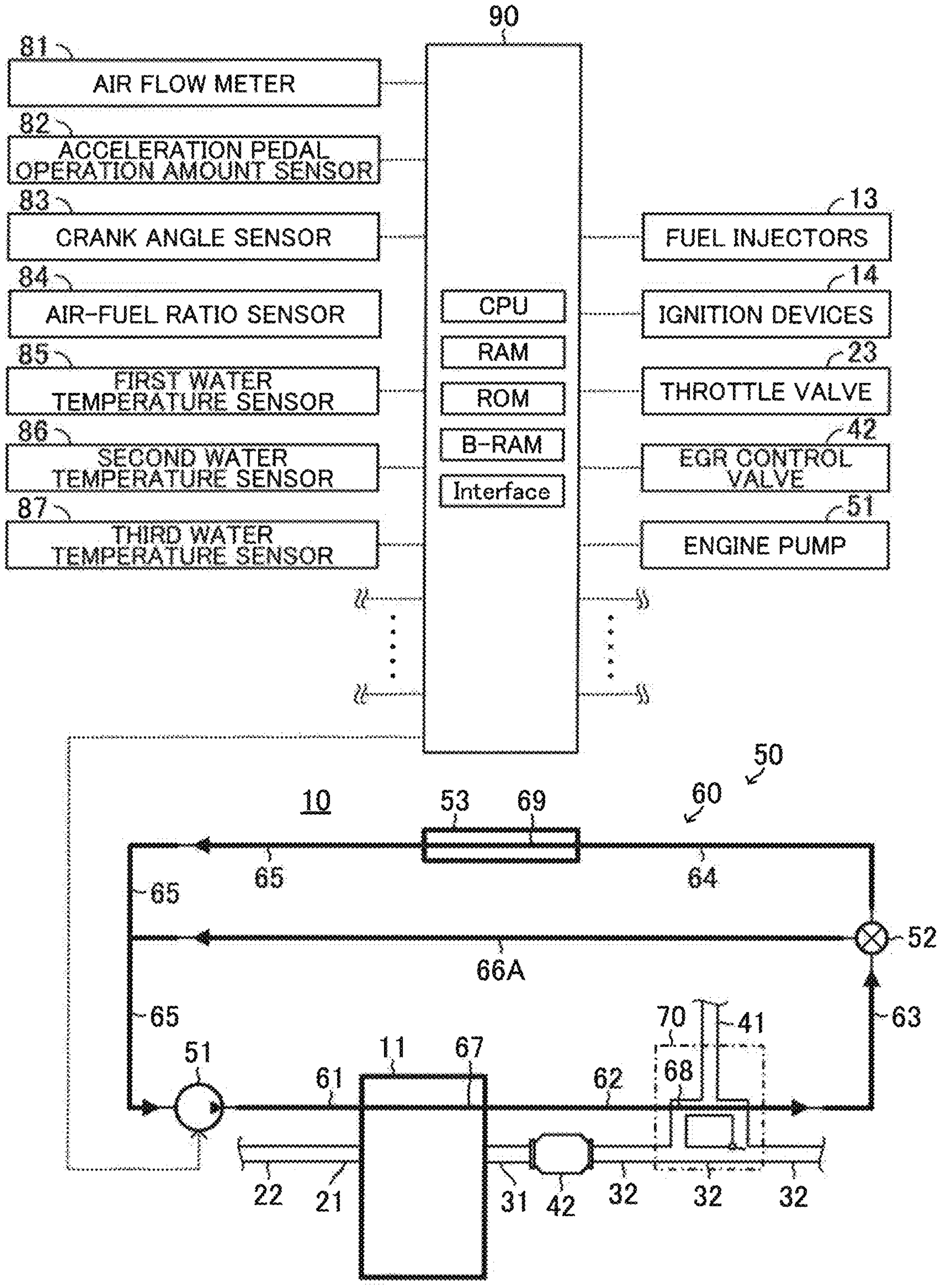
FIG. 8 is a view similar to the view shown in FIG. 1 and which shows the flow of the cooling water when the exhaust thermostatic valve is in the partial open state.

In addition, the cooling water flows as shown in FIG. 8 until the engine thermostatic valve 52 becomes the full open state after the engine thermostatic valve 52 starts to open. The flow of the cooling water shown in FIG. 8 is as follows.

The cooling water discharged from the engine pump 51 flows into the engine internal water passage 67 through the first water passage 61. The cooling water flows through the engine internal water passage 67 and then, flows into the heat exchange water passage 68 through the second water passage 62. The cooling water flows through the heat exchange water passage 68 and then, flows into the internal water passage of the engine thermostatic valve 52 through the third water passage 63.

A part of the cooling water flowing into the internal water passage of the engine thermostatic valve 52 flows into the radiator internal water passage 69 through the fourth water passage 64. The cooling water flows through the radiator internal water passage 69 and then, is suctioned into the engine pump 51 through the fifth water passage 65. The cooling water is cooled by the radiator 53 while the cooling water flows through the radiator internal water passage 69.

On the other hand, the remaining of the cooling water flowing into the internal water passage of the engine thermostatic valve 52 is suctioned into the engine pump 51 through the bypass water passage 66A and the fifth water passage 65.

The exhaust gas flows through the first exhaust branch pipe 71 and is cooled by the cooling water flowing through the heat exchange water passage 68 when (i) the exhaust gas flows as shown in FIG. 48, and (ii) the cooling water flows as shown in FIG. 8. The entirety of the cooled exhaust gas flows into the EGR pipe 41 through the third exhaust branch pipe 73.

Therefore, the exhaust heat recovery cooler apparatus 70 performs the exhaust gas supply function until the engine thermostatic valve 52 becomes the full open state after the engine thermostatic valve 52 starts to open.

The ability of the cooling water supplied to the engine internal water passage 67 requested to cool the engine 10 gradually increases after the point of time when the engine thermostatic valve 52 starts to open (see the point of time t64 in FIG. 6). Therefore, in the example shown in FIG. 6, the base discharge flow rate CW2 acquired from the look-up table MapCW2(NE,KL,Degr) gradually increases after the point of time when the engine thermostatic valve 52 starts to open. As a result, the target discharge flow rate CWtgt gradually increases, and the pump discharge flow rate CWpump gradually increases.

The engine thermostatic valve opening degree Deng gradually increases as the third water temperature TW3 increases after the third water temperature TW3 exceeds the third water temperature threshold TW3th. Thereby, the flow rate of the cooling water flowing through the radiator internal water passage 69 gradually increases. As a result, the flow rate of the cooling water cooled by the radiator 53 and supplied to the engine internal water passage 67 gradually increases.

<After Engine Thermostatic Valve Full Open>

The engine thermostatic valve 52 becomes the full open state when the third water temperature TW3 reaches the full-open water temperature TW3open.

Figure 9:
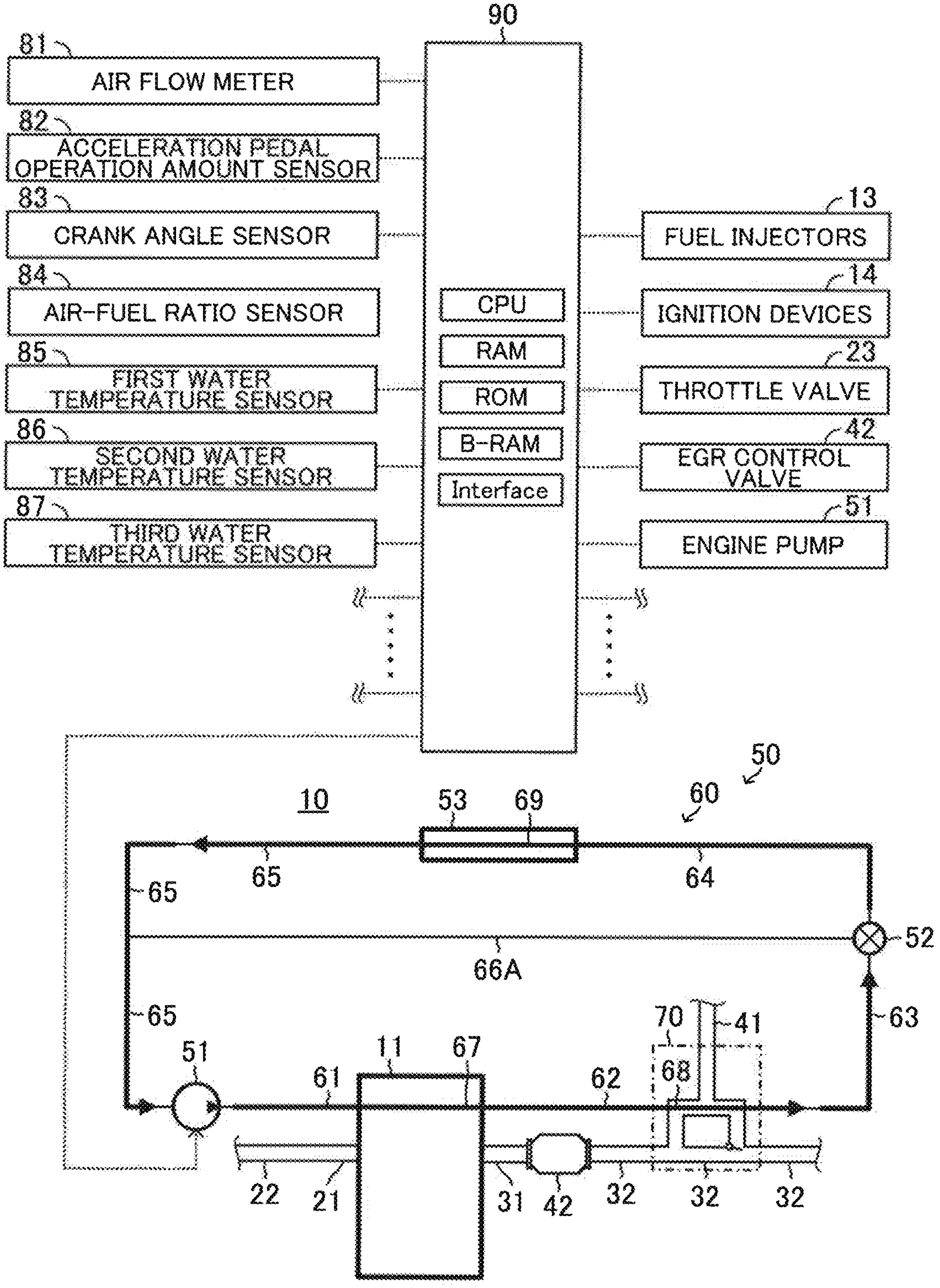
FIG. 9 is a view similar to the view shown in FIG. 1 and which shows the flow of the cooling water when the exhaust thermostatic valve is in the full open state.

The exhaust gas flows as shown in FIG. 48 after the engine thermostatic valve 52 becomes the full open state. The flow of the exhaust gas shown in FIG. 4B is described above. In addition, the cooling water flows as shown in FIG. 9 after the engine thermostatic valve 52 becomes the full open state. The flow of the cooling water shown in FIG. 9 is as follows.

The cooling water discharged from the engine pump 51 flows into the engine internal water passage 67 through the first water passage 61. The cooling water flows through the engine internal water passage 67 and then, flows into the heat exchange water passage 68 through the second water passage 62. The cooling water flows through the heat exchange water passage 68 and then, flows into the radiator internal water passage 69 through the third water passage 63, the internal water passage of the engine thermostatic valve 52, and the fourth water passage 64. The cooling water flows through the radiator internal water passage 69 and then, is suctioned into the engine pump 51 through the fifth water passage 65. The cooling water is cooled by the radiator 53 while the cooling water flows through the radiator internal water passage 69.

The exhaust gas flows through the first exhaust branch pipe 71 and is cooled by the cooling water flowing through the heat exchange water passage 68 when (i) the exhaust gas flows as shown in FIG. 48, and (ii) the cooling water flows as shown in FIG. 9. The entirety of the cooled exhaust gas flows into the EGR pipe 41 through the third exhaust branch pipe 73.

Therefore, the exhaust heat recovery cooler apparatus 70 performs the exhaust gas supply function after the engine thermostatic valve 52 becomes the full open state.

The summary of the operation of the embodiment control apparatus has been described. With the embodiment control apparatus, the pump discharge flow rate CWpump is increased to the flow rate, depending on the branch exhaust gas flow rate GASin at the point of time when the execution of the EGR control is started while the exhaust thermostatic valve 74A is in the full open state. Thus, it can be ensured to decrease the EGR gas temperature TGegr to the optimal temperature TGegr_opt even when the exhaust thermostatic valve 74A is in the full open state after the execution of the EGR control is started.

In addition, the pump discharge flow rate CWpump is controlled to the flow rate, depending on the branch exhaust gas flow rate GASin when (i) the EGR control is executed, and (ii) the exhaust thermostatic valve 74A is in the open state. Thus, it can be ensured to decrease the EGR gas temperature TGegr to the optimal temperature TGegr_opt when (i) the EGR control is executed, and (ii) the exhaust thermostatic valve 74A is in the open state.

<Specific Operation of Embodiment Control Apparatus>

Next, a specific operation of the embodiment control apparatus will be described. The CPU of the ECU 90 of the embodiment control apparatus is configured or programmed to execute a routine shown by a flowchart in FIG. 10 each time a predetermined length of time elapses.

Figure 10:
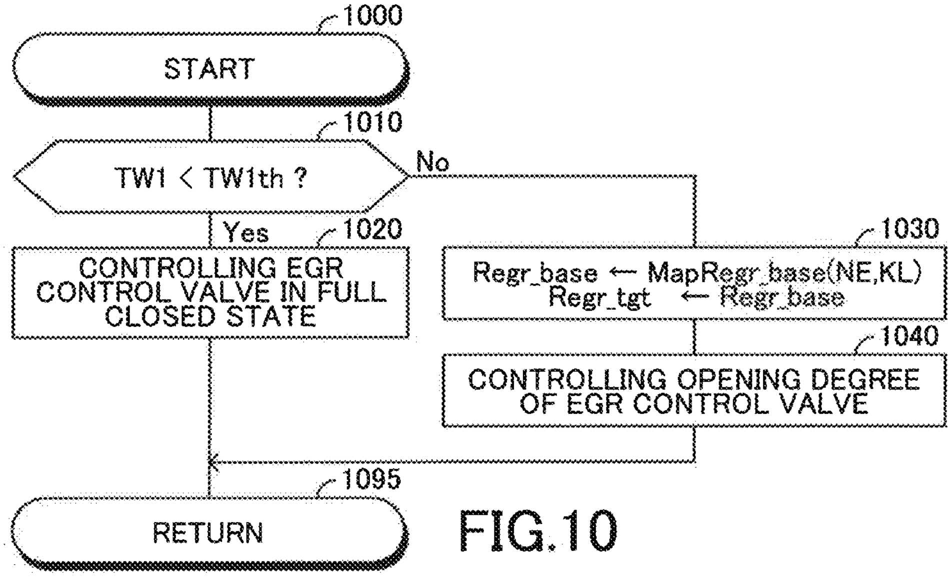
FIG. 10 is a view for showing a flow chart of a routine executed by a CPU of an ECU of the control apparatus according to the embodiment of the invention.

Therefore, at a predetermined timing, the CPU starts a process from a step 1000 in FIG. 10 and then, proceeds with the process to a step 1010 to determine whether the first water temperature TW1 is lower than the first water temperature threshold TW1th.

When the first water temperature TW1 is lower than the first water temperature threshold TW1th, the CPU determines "Yes" at the step 1010 and then, executes a process of a step 1020 described below. Then, the CPU proceeds with the process to a step 1095 to terminate this routine once.

Step 1020: The CPU controls the EGR control valve opening degree Degr to control the EGR control valve 42 in the full closed state.

On the other hand, when the first water temperature TW1 is higher than or equal to the first water temperature threshold TW1th, the CPU determines "No" at the step 1010 and then, sequentially executes processes of steps 1030 and 1040 described below. Then, the CPU proceeds with the process to the step 1095 to terminate this routine once.

Step 1030: The CPU applies the current engine speed NE and the current engine load KL to the look-up table MapRegr_base(NE,KL) to acquire the base EGR rate Regr_base. In addition, the CPU sets the acquired base EGR rate Regr_base as the target EGR rate Regr_tgt.

Step 1040: The CPU controls the EGR control valve opening degree Degr to control the EGR rate Regr to the target EGR rate Regr_tgt.

Figure 11:
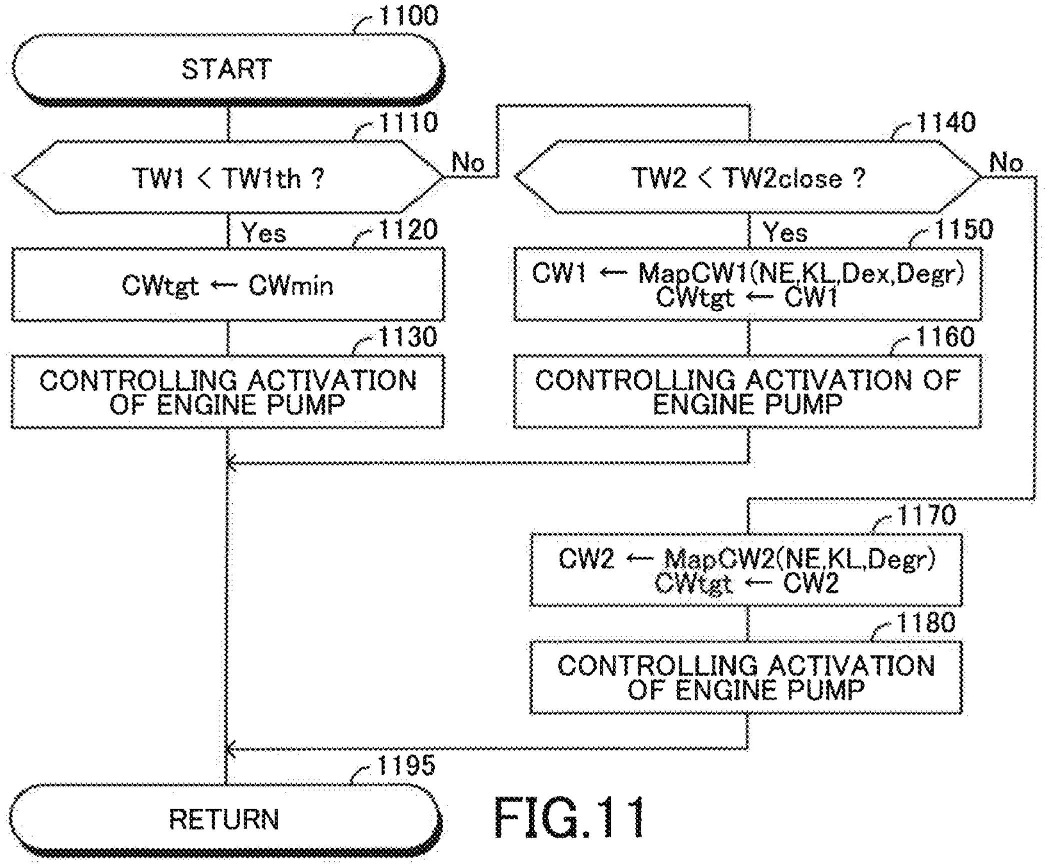
FIG. 11 is a view for showing a flow chart of a routine executed by the CPU.

In addition, the CPU is configured or programmed to execute a routine shown by a flowchart in FIG. 11 each time the predetermined length of time elapses. Therefore, at a predetermined timing, the CPU starts a process from a step 1100 in FIG. 11 and then, proceeds with the process to a step 1110 to determine whether the first water temperature TW1 is lower than the first water temperature threshold TW1th, i.e., whether (i) the EGR control is not executed, and (ii) the exhaust thermostatic valve 74A is in the full open state.

When the first water temperature TW1 is lower than the first water temperature threshold TW1th, the CPU determines "Yes" at the step 1110 and then, sequentially executes processes of steps 1120 and 1130 described below. Then, the CPU proceeds with the process to a step 1195 to terminate this routine once.

Step 1120: The CPU sets the minimum flow rate CWmin as the target discharge flow rate CWtg.

Step 1130: The CPU controls the activation of the engine pump 51 to control the pump discharge flow rate CWpump to the target discharge flow rate CWtgt set at the step 1120.

On the other hand, when the first water temperature TW1 is equal to or higher than the first water temperature threshold TW1th, the CPU determines "No" at the step 1110 and then, proceeds with the process to a step 1140 to determine whether the second water temperature TW2 is lower than the full closed water temperature TW2dose, i.e., whether (i) the EGR control is executed, and (ii) the exhaust thermostatic valve 74A is in the open state.

When the second water temperature TW2 is lower than the full closed water temperature TW2close, the CPU determines "Yes" at the step 1140 and then, sequentially executes processes of steps 1150 and 1160 described below. Then, the CPU proceeds with the process to the step 1195 to terminate this routine once.

Step 1150: The CPU applies the current engine speed NE, the current engine load KL, the current exhaust thermostatic valve opening degree Dex, and the current EGR control valve opening degree Degr to the look-up table MapCW1(NE,KL,Dex,Degr) to acquire the base discharge flow rate CW1. In addition, the CPU sets the acquired base discharge flow rate CW1 as the target discharge flow rate CWtgt.

Step 1160: The CPU controls the activation of the engine pump 51 to control the pump discharge flow rate CWpump to the target discharge flow rate CWtgt set at the step 1150.

On the other hand, when the second water temperature TW2 is equal to or higher than the full closed water temperature TW2dose, the CPU determines "No" at the step 1140 and then, sequentially executes processes of steps 1170 and 1180 described below. Then, the CPU proceeds with the process to the step 1195 to terminate this routine once.

Step 1170: The CPU applies the current engine speed NE, the current engine load KL, and the current EGR control valve opening degree Degr to the look-up table MapCW2(NE,KL,Degr) to acquire the base discharge flow rate CW2. In addition, the CPU sets the acquired base discharge flow rate CW2 as the target discharge flow rate CWtgt.

Step 1180: The CPU controls the activation of the engine pump 51 to control the pump discharge flow rate CWpump to the target discharge flow rate CWtgt set at the step 1170.

Figure 12:
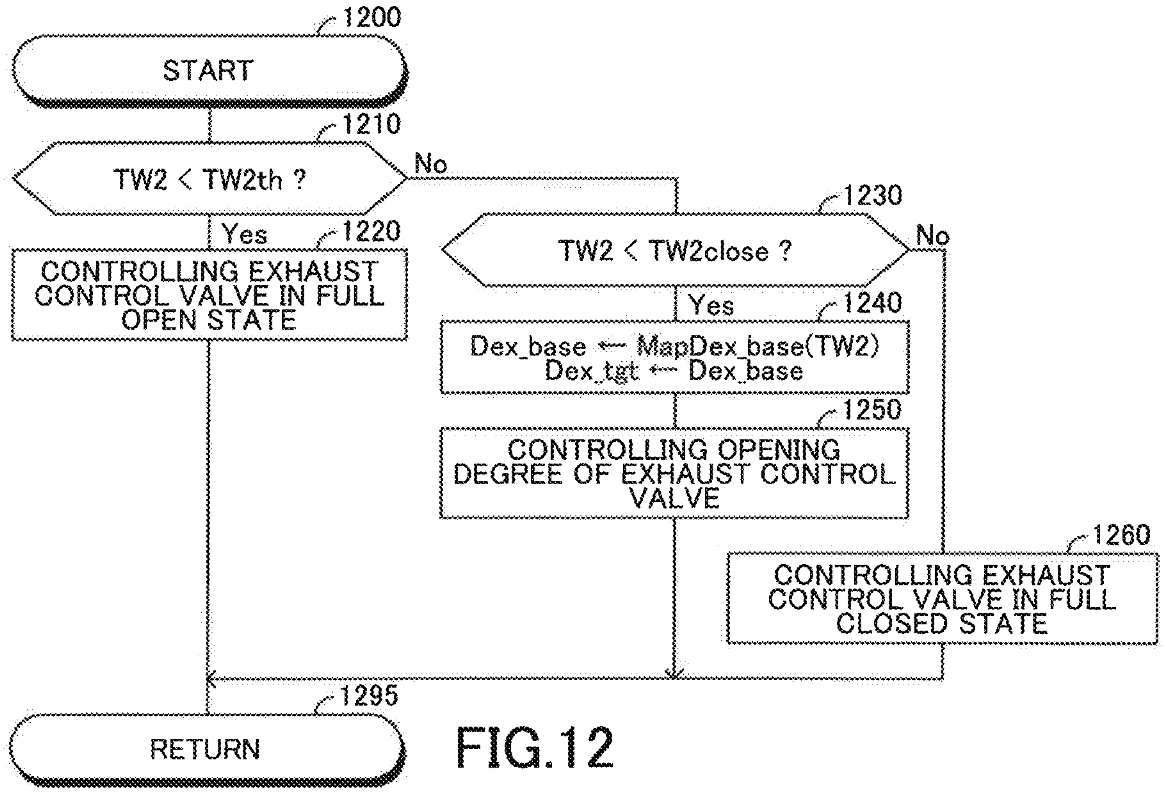
FIG. 12 is a view for showing a flow chart of a routine executed by the CPU.

It should be noted that the CPU is configured or programmed to execute a routine shown by a flowchart in FIG. 12 each time the predetermined length of time elapses when an exhaust control valve 748 is employed in place of the exhaust thermostatic valve 74A. In this case, at a predetermined timing, the CPU starts a process from a step 1200 in FIG. 12 and then, proceeds with the process to a step 1210 to determine whether the second water temperature TW2 is lower than the second water temperature threshold TW2th.

When the second water temperature TW2 is lower than the second water temperature threshold TW2th, the CPU determines "Yes" at the step 1210 and then, executes a process of a step 1220 described below. Then, the CPU proceeds with the process to a step 1295 to terminate this routine once.

Step 1220: The CPU controls the opening degree Dex of the exhaust control valve 748 to control the exhaust control valve 74B in the full open state.

On the other hand, when the second water temperature TW2 is equal to or higher than the second water temperature threshold TW2th, the CPU determines "No" at the step 1210 and then, proceeds with the process to a step 1230 to determine whether the second water temperature TW2 is lower than the full closed water temperature TW2close.

When the second water temperature TW2 is lower than the full closed water temperature TW2close, the CPU determines "Yes" at the step 1230 and then, sequentially executes processes of steps 1240 and 1250 described below. Then, the CPU proceeds with the process to the step 1295 to terminate this routine once.

Step 1240: The CPU applies the current second water temperature TW2 to a look-up table MapDex_base(TW2) to acquire a base exhaust control valve opening degree Dex_base. In addition, the CPU sets the acquired base exhaust control valve opening degree Dex_base as a target exhaust control valve opening degree Dex_tgt.

Step 1250: The CPU controls the opening degree Dex of the exhaust control valve 748 to control the opening degree Dex of the exhaust control valve 74B to the target exhaust control valve opening degree Dex_tgt set at the step 1240.

On the other hand, when the second water temperature TW2 is equal to or higher than the full closed water temperature TW2dose, the CPU determines "No" at the step 1230 and then, executes a process of a step 1260 described below. Then, the CPU proceeds with the process to the step 1295 to terminate this routine once.

Step 1260: The CPU controls the opening degree Dex of the exhaust control valve 748 to control the exhaust control valve 748 in the full closed state.

The specific operation of the embodiment control apparatus has been described. With the embodiment control apparatus, the pump discharge flow rate CWpump is increased to the flow rate, depending on the branch exhaust gas flow rate GASin (see the processes of the steps 1150 and 1160) at the point of time when the execution of the EGR control is started while the exhaust thermostatic valve 74A is in the full open state (see a determination "No" at the step 1110 and a determination "Yes" at the step 1140). Thereby, it can be ensured to decrease the EGR gas temperature TGegr to the optimal temperature TGegr_opt even when the exhaust thermostatic valve 74A s in the full open state after the execution of the EGR control is started.

It should be noted that the invention is not limited to the aforementioned embodiment and various modifications can be employed within the scope of the invention.

First Modified Example

In general, the requested cooling ability of the exhaust heat recovery cooler apparatus 70 increases as the flow rate GASeng of the exhaust gas discharged from the combustion chambers 12 increases when (i) the EGR control is executed, and (ii) the exhaust thermostatic valve 74A is in the open state. The flow rate GASeng of the exhaust gas discharged from the combustion chambers 12 increases as (i) the engine speed NE increases, and (ii) the engine load KL increases. Hereinafter, the flow rate GASeng of the exhaust gas discharged from the combustion chambers 12 will be referred to as "the engine exhaust gas flow rate GASeng.

Accordingly, in a first modified example of the embodiment of the invention, the pump discharge flow rates CWpump capable of achieving the requested cooling ability of the exhaust heat recovery cooler apparatus 70 are acquired as base discharge flow rates CW1*a* by the experiments as to every combination of the engine speed NE, the engine load KL, the exhaust thermostatic valve opening degree Dex, and the EGR control valve opening degree Degr when (i) the EGR control is executed, (ii) the exhaust thermostatic valve 74A is in the open state, and (iii) the engine exhaust gas flow rate GASeng is smaller than a predetermined flow rate GASth.

The acquired base discharge flow rates CW1*a* are stored in the memory or the ROM of the control apparatus according to the first modified example of the embodiment of the invention in the form of a look-up table MapCW1*a*(NE,KL, Dex,Degr) for acquiring the base discharge flow rate CW1*a*, based on the engine speed NE, the engine load KL, the exhaust thermostatic valve opening degree Dex, and the EGR control valve opening degree Degr. The base discharge flow rate CW1*a* acquired from the look-up table MapCW1*a* (NE,KL,Dex,Degr) increases as (i) the engine speed NE increases, (ii) the engine load KL increases, (iii) the exhaust thermostatic valve opening degree Dex increases, and (iv) the EGR control valve opening degree Degr increases. Hereinafter, the control apparatus according to the first modified example of the embodiment of the invention will be referred to as "the first modified control apparatus".

In addition, in the first modified example of the embodiment of the invention, the pump discharge pump discharge flow rates CWpump capable of achieving the requested cooling ability of the exhaust heat recovery cooler apparatus 70 are acquired as base discharge flow rates CW1*b* by the experiments as to every combination of the engine speed NE, the engine load KL, the exhaust thermostatic valve opening degree Dex, and the EGR control valve opening degree Degr when (i) the EGR control is executed, (ii) the exhaust thermostatic valve 74A is in the open state, and (iii) the engine exhaust gas flow rate GASeng is equal to or greater than the predetermined flow rate GASth.

The acquired base discharge flow rates CW1*b* are stored in the memory or the ROM of the first modified control apparatus in the form of a look-up table MapCW1*b*(NE,KL, Dex,Degr) for acquiring the base discharge flow rate CW1*b*, based on the engine speed NE, the engine load KL, the exhaust thermostatic valve opening degree Dex, and the EGR control valve opening degree Degr. The base discharge flow rate CW1*b* acquired from the look-up table MapCW1*b* (NE,KL,Dex,Degr) increases as (i) the engine speed NE increases, (ii) the engine load KL increases, (iii) the exhaust thermostatic valve opening degree Dex increases, and (iv) the EGR control valve opening degree Degr increases.

In this regard, the base discharge flow rate CW1*b* acquired from the look-up table MapCW1*b*(NE,KL,Dex, DeDegr) is greater than the base discharge flow rate CW1*a* acquired from the look-up table MapCW1*a*(NE,KL,Dex, Degr) when the engine speed NE, the engine load KL, the exhaust thermostatic valve opening degree Dex, and the EGR control valve opening degree Degr are the same.

The first modified control apparatus acquires the base discharge flow rate CW1*a* by applying the current engine speed NE, the current engine load KL, the current exhaust thermostatic valve opening degree Dex, and the current EGR control valve opening degree Degr to the look-up table MapCW1*a*(NE,KL,Dex,Degr) when (i) the EGR control is executed, (ii) the exhaust thermostatic valve 74A is in the open state, and (iii) the engine exhaust gas flow rate GASeng is smaller than the predetermined flow rate GASth. Then, the first modified control apparatus sets the acquired base discharge flow rate CW1*a* as the target discharge flow rate CWtgt. The first modified control apparatus controls the activation of the engine pump 51 to control the pump discharge flow rate CWpump to the target discharge flow rate CWtgt (=CW1*a*).

On the other hand, the first modified control apparatus acquires the base discharge flow rate CW1*b* by applying the current engine speed NE, the current engine load KL, the current exhaust thermostatic valve opening degree Dex, and the current EGR control valve opening degree Degr to the look-up table MapCW1*b*(NE,KL,Dex,Degr) when (i) the EGR control is executed, (ii) the exhaust thermostatic valve 74A is in the open state, and (iii) the engine exhaust gas flow rate GASeng is equal to or greater than the predetermined flow rate GASth. Then, the first modified control apparatus sets the acquired base discharge flow rate CW1*b* as the target discharge flow rate CWtgt. The first modified control apparatus controls the activation of the engine pump 51 to control the pump discharge flow rate CWpump to the target discharge flow rate CWtgt (=CW1*b*).

With the first modified control apparatus, the pump discharge flow rate CWpump is controlled to a relatively small flow rate when (i) the EGR control is executed, (ii) the exhaust thermostatic valve 74A is in the open state, and (iii) the engine exhaust gas flow rate GASeng is small. On the other hand, the pump discharge flow rate CWpump is controlled to a relatively large flow rate when (i) the EGR control is executed, (ii) the exhaust thermostatic valve 74A is in the open state, and (iii) the engine exhaust gas flow rate GASeng is large. Thus, it can be ensured to decrease the EGR gas temperature TGegr to the optimal temperature TGegr_opt.

It should be noted that a process of cooling the EGR gas is not requested, but a process of warming the engine 10, i.e., a process of increasing the engine temperature Teng is requested when (i) the EGR control is not executed, and (ii) the exhaust thermostatic valve 74A is in the full open state, i.e., when the first water temperature TW1 is lower than the first water temperature threshold TW1th. Accordingly, similar to the embodiment control apparatus, the first modified control apparatus sets the minimum flow rate CWmin as the target discharge flow rate CWtgt when (i) the first modified control apparatus does not execute the EGR control, and (ii) the exhaust thermostatic valve 74A is in the full open state. In this case, the first modified control apparatus controls the activation of the engine pump 51 to control the pump discharge flow rate CWpump to the target discharge flow rate CWtgt corresponding to the minimum flow rate CWmin.

Further, the process of cooling the EGR gas is requested, but the process of warming the engine 10 is not requested when (i) the EGR control is executed, and (ii) the exhaust thermostatic valve 74A is in the full closed state, i.e., when the second water temperature TW2 is equal to or higher than the full closed water temperature TW2close. Accordingly, similar to the embodiment control apparatus, the first modified control apparatus acquires the base discharge flow rate CW2 by applying the current engine speed NE, the current engine load KL, and the current EGR control valve opening degree Degr to the look-up table MapCW2(NE,KL,Degr) when (i) the first modified control apparatus executes the EGR control, and (ii) the exhaust thermostatic valve 74A is in the full closed state. The first modified control apparatus sets the acquired base discharge flow rate CW2 as the target discharge flow rate CWtgt. The first modified control apparatus controls the activation of the engine pump 51 to control the pump discharge flow rate CWpump to the target discharge flow rate CWtgt corresponding to the base discharge flow rate CW2.

<Specific Operation of First Modified Control Apparatus>

Next, the specific operation of the first modified control apparatus will be described. The CPU of the ECU 90 of the first modified control apparatus is configured or programmed to execute a routine shown by a flowchart in FIG. 13 each time the predetermined length of time elapses in place of the routine shown in FIG. 11.

Figure 13:
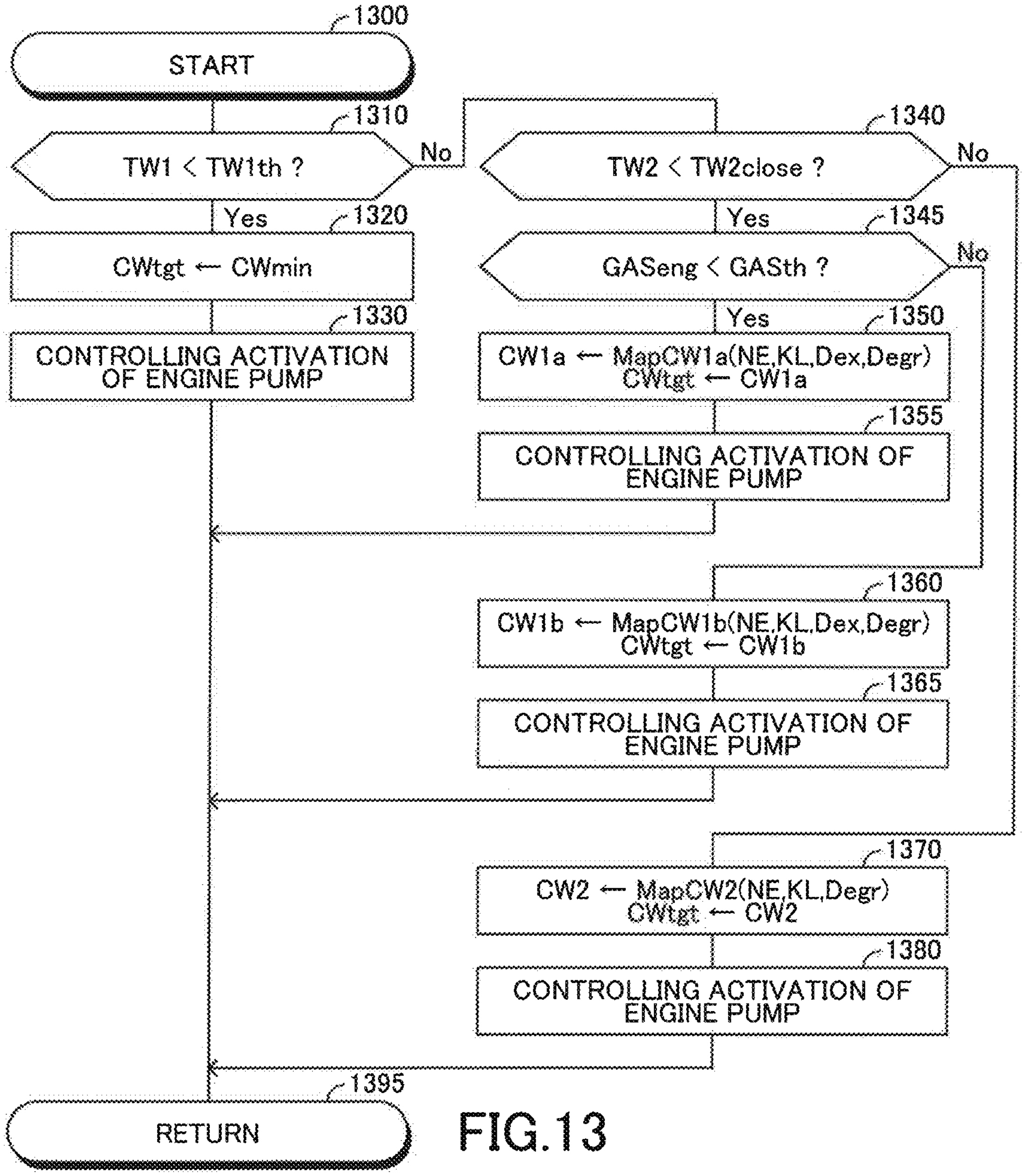
FIG. 13 is a view for showing a flow chart of a routine executed by the CPU of the ECU of the control apparatus according to a first modified example of the embodiment of the invention.

Therefore, at a predetermined timing, the CPU starts a process from a step 1300 in FIG. 13 and then, proceeds with the process to a step 1310 to determine whether the first water temperature TW1 is lower than the first water temperature threshold TW1th, i.e., whether (i) the EGR control is not executed, and (ii) the exhaust thermostatic valve 74A is in the full open state.

When the first water temperature TW1 is lower than the first water temperature threshold TW1th, the CPU determines "Yes" at the step 1310 and then, sequentially executes processes of steps 1320 and 1330 described below. Then, the CPU proceeds with the process to a step 1395 to terminate this routine once.

Step 1320: The CPU sets the minimum flow rate CWmin as the target discharge flow rate CWtg.

Step 1330: The CPU controls the activation of the engine pump 51 to control the pump discharge flow rate CWpump to the target discharge flow rate CWtgt set at the step 1320.

On the other hand, when the first water temperature TW1 is equal to or higher than the first water temperature threshold TW1th, the CPU determines "No" at the step 1310 and then, proceeds with the process to a step 1340 to determine whether the second water temperature TW2 is lower than the full closed water temperature TW2dose, i.e., whether (i) the EGR control is executed, and (ii) the exhaust thermostatic valve 74A is in the open state.

When the second water temperature TW2 is lower than the full closed water temperature TW2close, the CPU determines "Yes" at the step 1340 and then, proceeds with the process to a step 1345 to determine whether the engine exhaust gas flow rate GASeng is smaller than the predetermined flow rate GASth.

When the engine exhaust gas flow rate GASeng is smaller than the predetermined flow rate GASth, the CPU determines "Yes" at the step 1345 and then, sequentially executes processes of steps 1350 and 1355 described below. Then, the CPU proceeds with the process to the step 1395 to terminate this routine once.

Step 1350: The CPU applies the current engine speed NE, the current engine load KL, the current exhaust thermostatic valve opening degree Dex, and the current EGR control valve opening degree Degr to the look-up table MapCW1*a* (NE,KL,De,Degr) to acquire the base discharge flow rate CW1*a*. In addition, the CPU sets the acquired base discharge flow rate CW1*a* as the target discharge flow rate CWtgt.

Step 1355: The CPU controls the activation of the engine pump 51 to control the pump discharge flow rate CWpump to the target discharge flow rate CWtgt (=CW1*a*) set at the step 1350.

On the other hand, when the engine exhaust gas flow rate GASeng is equal to or greater than the predetermined flow rate GASth, the CPU determines "No" at the step 1345 and then, sequentially executes processes of steps 1360 and 1365 described below. Then, the CPU proceeds with the process to the step 1395 to terminate this routine once.

Step 1360: The CPU applies the current engine speed NE, the current engine load KL, the current exhaust thermostatic valve opening degree Dex, and the current EGR control valve opening degree Degr to the look-up table MapCW1*b*(NE,KL,Dex,Degr) to acquire the base discharge flow rate CW1*b*. In addition, the CPU sets the acquired base discharge flow rate CW1*b* as the target discharge flow rate CWtgt.

Step 1365: The CPU controls the activation of the engine pump 51 to control the pump discharge flow rate CWpump to the target discharge flow rate CWtgt (=CW1*b*) set at the step 1360.

When the second water temperature TW2 is equal to or higher than the full closed water temperature TW2close at a point of time of executing a process of the step 1340, the CPU determines "No" at the step 1340 and then, sequentially executes processes of steps 1370 and 1380 described below. Then, the CPU proceeds with the process to the step 1395 to terminate this routine once.

Step 1370: The CPU applies the current engine speed NE, the current engine load KL, and the current EGR control valve opening degree Degr to the look-up table MapCW2(NE,KL,Degr) to acquire the base discharge flow rate CW2. In addition, the CPU sets the acquired base discharge flow rate CW2 as the target discharge flow rate CWtgt.

Step 1380: The CPU controls the activation of the engine pump 51 to control the pump discharge flow rate CWpump to the target discharge flow rate CWtgt (=CW2) set at the step 1370.

The specific operation of the first modified control apparatus has been described. With the first modified control apparatus, the pump discharge flow rate CWpump is controlled to the relatively small flow rate (see the processes of the steps 1350 and 1355) when (i) the EGR control is executed, (ii) the exhaust thermostatic valve 74A is in the open state, and (iii) the engine exhaust gas flow rate GASeng is small (see a determination "No" at the step 1310 and determinations "Yes" at the steps 1340 and 1345). On the other hand, the pump discharge flow rate CWpump is controlled to the relatively large flow rate (see the processes of the steps 1360 and 1365) when (i) the EGR control is executed, (ii) the exhaust thermostatic valve 74A is in the open state, and (iii) the engine exhaust gas flow rate GASeng is large (see the determination "No" at the step 1310, the determination "Yes" at the step 1340 and a determination "No" at the step 1345). Thereby, the EGR gas temperature TGegr may be decreased to the optimal temperature TGegr_opt.

Second Modified Example

In general, the requested cooling ability of the exhaust heat recovery cooler apparatus 70 increases as (i) the branch exhaust gas flow rate GASin increases, and (ii) the EGR gas flow rate GASegr increases. The branch exhaust gas flow rate GASin increases as (i) the engine exhaust gas flow rate GASeng Increases, and (ii) the exhaust thermostatic valve opening degree Dex increases. The engine exhaust gas flow rate GASeng increases as (i) the engine speed NE increases, and (ii) the engine load KL increases. In addition, the EGR gas flow rate GASegr increases as the EGR control valve opening degree Degr increases.

Accordingly, in a second modified example of the embodiment of the invention, the pump discharge flow rates CWpump capable of achieving the requested cooling ability of the exhaust heat recovery cooler apparatus 70 are acquired as base discharge flow rates CWbase by the experiments as to every combination of the engine speed NE, the engine load KL, the exhaust thermostatic valve opening degree Dex, and the EGR control valve opening degree Degr.

The acquired base discharge flow rate CWbase are stored in the memory or the ROM of the control apparatus according to the second modified example of the embodiment of the invention in the form of a look-up table MapCWbase(NE,KLDexDegr) for acquiring the base discharge flow rate CWbase, based on the engine speed NE, the engine load KL, the exhaust thermostatic valve opening degree Dex, and the EGR control valve opening degree Degr. The base discharge flow rate CWbase acquired from the look-up table MapCWbase(NE,KL,Dex,Degr) is equal to the minimum flow rate CWmin when the EGR control valve opening degree Degr is zero. In addition, the base discharge flow rate CWbase acquired from the look-up table MapCWbase(NE,KL,Dex,Degr) increases as (i) the engine speed NE increases, (ii) the engine load KL increases, (iii) the exhaust thermostatic valve opening degree Dex increases, and (iv) the EGR control valve opening degree Degr increases when the EGR control valve opening degree Degr is greater than zero. Hereinafter, the control apparatus according to the second modified example of the embodiment of the invention will be referred to as "the second modified control apparatus".

The second modified control apparatus acquires the base discharge flow rate CWbase by applying the current engine speed NE, the current engine load KL, the current exhaust thermostatic valve opening degree Dex, and the current EGR control valve opening degree Degr to the look-up table MapCWbase(NE,KL,Dex,Degr). Then, the second modified control apparatus sets the acquired base discharge flow rate CWbase as the target discharge flow rate CWtgt. The second modified control apparatus controls the activation of the engine pump 51 to control the pump discharge flow rate CWpump to the target discharge flow rate CWtgt (=CWbase).

With the second modified control apparatus, the pump discharge flow rate CWpump is controlled, depending to the branch exhaust gas flow rate GASin when (i) the EGR control is executed, and (ii) the exhaust thermostatic valve 74A is in the open state. Thus, it can be ensured to decrease the EGR gas temperature TGegr to the optimal temperature TGegr_opt when (i) the EGR control is executed, and (ii) the exhaust thermostatic valve 74A is in the open state.

<Specific Operation of Second Modified Control Apparatus>

Next, the specific operation of the second modified control apparatus will be described. The CPU of the ECU 90 of the second modified control apparatus is configured or programmed to execute a routine shown by a flowchart in FIG. 14 each time the predetermined length of time elapses in place of the routine shown in FIG. 11.

Figure 14:
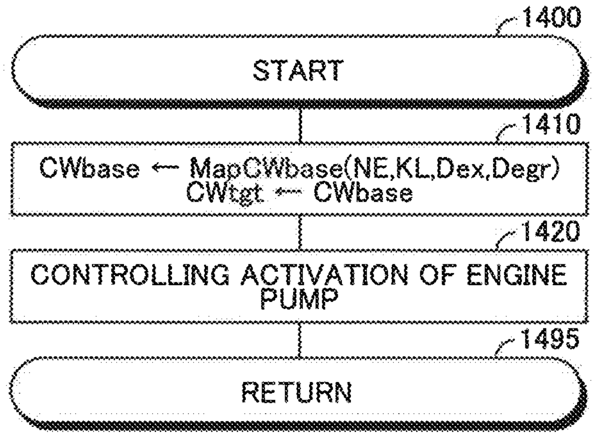
FIG. 14 is a view for showing a flow chart of a routine executed by the CPU of the ECU of the control apparatus according to a second modified example of the embodiment of the invention.

Therefore, at a predetermined timing, the CPU starts a process from a step 1400 in FIG. 14 and then, sequentially executes processes of steps 1410 and 1420 described below. Then, the CPU proceeds with the process to a step 1495 to terminate this routine once.

Step 1410: The CPU applies the current engine speed NE, the current engine load KL, the current exhaust thermostatic valve opening degree Dex, and the current EGR control valve opening degree Degr to the look-up table MapCWbase(NE,KL,Dex,Degr) to acquire the base discharge flow rate CWbase. In addition, the CPU sets the acquired base discharge flow rate CWbase as the target discharge flow rate CWtgt.

Step 1420: The CPU controls the activation of the engine pump 51 to control the pump discharge flow rate CWpump to the target discharge flow rate CWtst set at the step 1410.

The specific operation of the second modified control apparatus has been described. With the second modified control apparatus, the pump discharge flow rate CWpump is controlled, depending on the branch exhaust gas flow rate GASin when (i) the EGR control is executed, and (ii) the exhaust thermostatic valve 74A is in the open state. Thereby, the EGR gas temperature TGegr may be decreased to the optimal temperature TGegr_opt when (i) the EGR control is executed, and (i) the exhaust thermostatic valve 74A is in the open state.

Third Modified Example

In the embodiment, the first modified control apparatus, and the second modified control apparatus, the flow rate of the cooling water supplied to the heat exchange water passage 68 is controlled by controlling the pump discharge flow rate CWpump. In this regard, the cooling system 50 may be configured as shown in FIG. 15.

Figure 15:
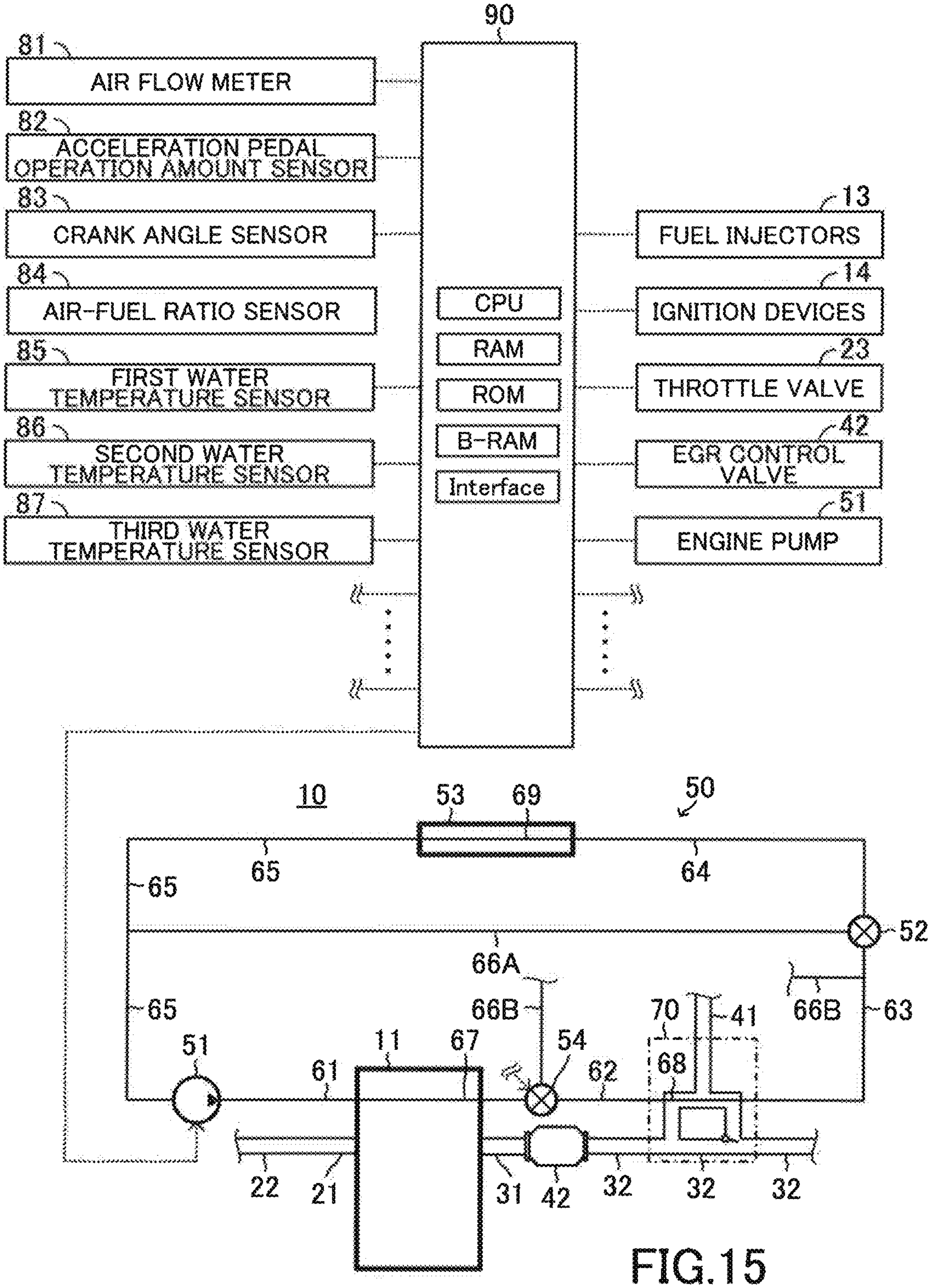
FIG. 15 is a view for showing the internal combustion engine, to which the control apparatus according to a third modified example of the embodiment of the invention is applied.

The cooling system 50 shown in FIG. 15 includes a cooling water flow rate control valve 54 and a branch engine water passage 66B in addition to the elements of the cooling system 50 according to the embodiment of the invention. The cooling water flow rate control valve 54 is provided in the second water passage 62. One end of the branch engine water passage 668 is fluidically connected to the second water passage 62 through the cooling water flow rate control valve 54. The other end of the branch engine water passage 668 is fluidically connected to the third water passage 63. The branch engine water passage 66B is provided, passing through devices required to be cooled other than the exhaust heat recovery cooler apparatus 70. The devices required to be cooled other than the exhaust heat recovery cooler apparatus 70 are, for example, the rechargeable battery and a power control unit of the plug-in hybrid.

The cooling water flow rate control valve 54 may flow a part or an entirety of the cooling water, which flows into the second water passage 62 from the engine internal water passage 67, into the branch engine water passage 668. The entirety of the cooling water, which flows into the second water passage 62 from the engine internal water passage 67, flows into the second water passage 62 downstream of the cooling water flow rate control valve 54 when the cooling water flow rate control valve 54 is in a full open state. On the other hand, the entirety of the cooling water, which flows into the second water passage 62 from the engine internal water passage 67, flows into the branch engine water passage 668 through the cooling water flow rate control valve 54 when the cooling water flow rate control valve 54 is in a full closed state. Further, a part of the cooling water, which flows into the second water passage 62 from the engine internal water passage 67, flows into the second water passage 62 downstream of the cooling water flow rate control valve 54, and the remaining cooling water flows into the branch engine water passage 668 through the cooling water flow rate control valve 54 when the cooling water flow rate control valve 54 is in an open state between the full open state and the full closed state. Thus, the flow rate of the cooling water supplied to the heat exchange water passage 68 can be controlled by controlling an opening degree Dcw of the cooling water flow rate control valve 54.

Accordingly, the control apparatus according to a third modified example of the embodiment of the invention sets the minimum flow rate CWmin as the target discharge flow rate CWtgt when a process to cool the devices required to be cooled other than the exhaust heat recovery cooler apparatus 70 is not requested before the first water temperature TW1 reaches the first water temperature threshold TW1th after the operation of the engine 10 is started. Then, the control apparatus according to the third modified example controls (i) the activation of the engine pump 51 to control the pump discharge flow rate CWpump to the target discharge flow rate CWtgt (=CWmin) and (ii) the opening degree Dcw of the cooling water flow rate control valve 54 to control the cooling water flow rate control valve 54 in the full open state. Hereinafter, the control apparatus according to the third modified example of the embodiment of the invention will be referred to as "the third modified control apparatus", and the device required to be cooled other than the exhaust heat recovery cooler apparatus 70 will be referred to as "the cooling-required device".

The third modified control apparatus sets a flow rate CWtotal as the target discharge flow rate CWtgt when the process to cool the cooling-required devices is requested before the first water temperature TW1 reaches the first water temperature threshold TW1th. The flow rate CWtotal is acquired by adding a device required flow rate CWdev_req to the minimum flow rate CWmin (CWtotal=CWmin+CWdev_req). The device-required flow rate CWdev_req is the flow rate of the cooling water required for a temperature Tdev of the cooling-required device to an optimal temperature Tdev_opt.

The third modified control apparatus controls the activation of the engine pump 51 to control the pump discharge flow rate CWpump to the target discharge flow rate CWtgt (=CWtotal). In addition, the third modified control apparatus controls the opening degree Dcw of the cooling water flow rate control valve 54 to flow the cooling water having the device-required flow rate CWdev_req into the branch engine water passage 668.

Then, the third modified control apparatus starts the execution of the EGR control when the first water temperature TW1 reaches the first water temperature threshold TW1th. At this moment, the third modified control apparatus acquires the base discharge flow rate CW1 by applying the current engine speed NE, the current engine load KL, the current exhaust thermostatic valve opening degree Dex, and the current EGR control valve opening degree Degr to the look-up table MapCW1(NE,KL,Dex,Degr).

In this regard, the third modified control apparatus sets the acquired base discharge flow rate CW1 as the target discharge flow rate CWtgt when the process to cool the cooling-required devices is not requested. The third modified control apparatus controls the activation of the engine pump 51 to control the pump discharge flow rate CWpump to the target discharge flow rate CWtgt (=CW1). In addition, the third modified control apparatus controls the opening degree Dcw of the cooling water flow rate control valve 54 to control the cooling water flow rate control valve 54 in the full open state.

The third modified control apparatus sets the flow rate CWtotal acquired by adding the device-required flow rate CWdev_req to the base discharge flow rate CW1 as the target discharge flow rate CWtgt when the process to cool the cooling-required devices is requested.

Then, the third modified control apparatus controls the activation of the engine pump 51 to control the pump discharge flow rate CWpump to the target discharge flow rate CWtgt (=CWtotal). In addition, the third modified control apparatus controls the opening degree Dcw of the cooling water flow rate control valve 54 to flow the cooling water having the device-required flow rate CWdev_req into the branch engine water passage 66B.

Then, the third modified control apparatus acquires the base discharge flow rate CW2 by applying the current engine speed NE, the current engine load KL, and the current EGR control valve opening degree Degr to the look-up table MapCW2(NE,KL,Degr) after the second water temperature TW2 reaches the full closed water temperature TW2dose, i.e., the state of the exhaust thermostatic valve 74A becomes the full closed state.

At this moment, the third modified control apparatus sets the acquired base discharge flow rate CW2 as the target discharge flow rate CWtgt when the process to cool the cooling-required devices is not requested. The third modified control apparatus controls the activation of the engine pump 51 to control the pump discharge flow rate CWpump to the target discharge flow rate CWtgt (=CW2). In addition, the third modified control apparatus controls the opening degree Dcw of the cooling water flow rate control valve 54 to control the cooling water flow rate control valve 54 in the full open state.

On the other hand, the third modified control apparatus sets the flow rate CWtotal acquired by adding the device-required flow rate CWdev_req to the base discharge flow rate CW2 (CWtotal=CW2+CWdev_req) as the target discharge flow rate CWtgt when the process to cool the cooling-required devices is requested.

Then, the third modified control apparatus controls the activation of the engine pump 51 to control the pump discharge flow rate CWpump to the target discharge flow rate CWtgt (=CWtotal). In addition, the third modified control apparatus controls the opening degree Dcw of the cooling water flow rate control valve 54 to flow the cooling water having the device-required flow rate CWdev_req into the branch engine water passage 668.

With the third modified control apparatus, it can be ensured to decrease the EGR gas temperature TGegr to the optimal temperature TGegr_opt when (i) the execution of the EGR control is started, and (ii) the exhaust thermostatic valve 74A is in the full open state. In addition, it can be ensured to decrease the EGR gas temperature TGegr to the optimal temperature TGegr_opt when (i) the EGR control is executed, and (ii) the exhaust thermostatic valve 74A is in the open state.

Further, with the third modified control apparatus, the cooling water having the flow rate smaller than the pump discharge flow rate CWpump can be supplied to the heat exchange water passage 68. Therefore, it can be ensured to (i) supply the cooling water having a heat-exchange-required flow rate to the heat exchange water passage 68 and (ii) supply the cooling water having an engine-required flow rate to the engine internal water passage 67 when the engine-required flow rate is larger than the heat-exchange-required flow rate. In this regard, the heat-exchange-required flow rate is the flow rate of the cooling water required to be supplied to the heat exchange water passage 68, and the engine-required flow rate is the flow rate of the cooling water required to be supplied to the engine internal water passage 67.

<Specific Operation of Third Modified Control Apparatus>

Figure 16:
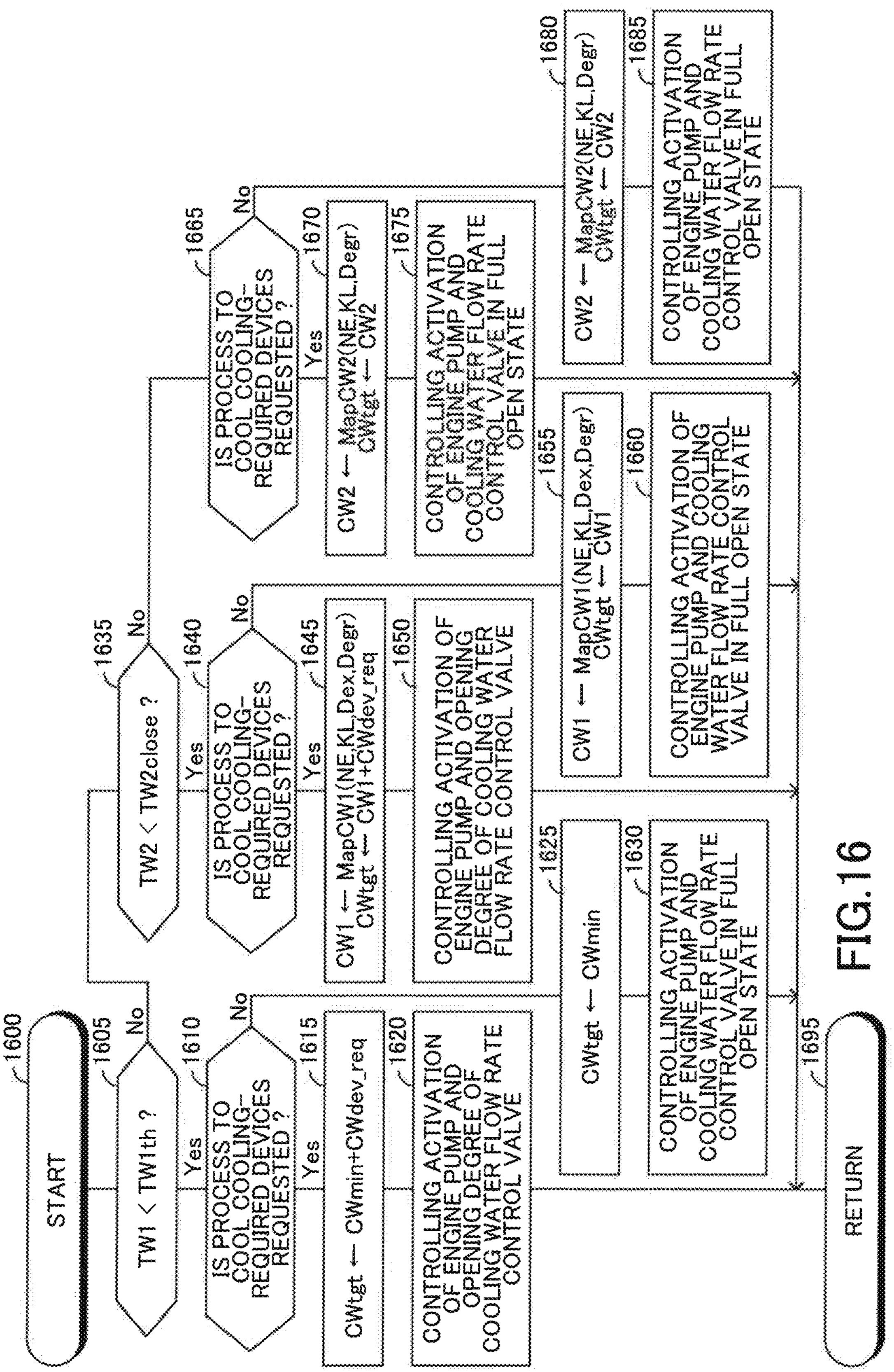
FIG. 16 is a view for showing a flow chart of a routine executed by the CPU of the ECU of the control apparatus according to the third modified example of the embodiment of the invention.

The CPU of the ECU 90 of the third modified control apparatus is configured or programmed to execute a routine shown by a flowchart in FIG. 16 each time the predetermined length of time elapses in place of the routine shown in FIG. 11. Therefore, at a predetermined timing, the CPU starts a process from a step 1600 in FIG. 16 and then, proceeds with the process to a step 1605 to determine whether the first water temperature TW1 is lower than the first water temperature threshold TW1th.

When the first water temperature TW1 is lower than the first water temperature threshold TW1th, the CPU determines "Yes" at the step 1605 and then, proceeds with the process to a step 1610 to determine whether the process to cool the cooling-required devices is requested.

When the process to cool the cooling-required devices is requested, the CPU determines "Yes" at the step 1610 and then, sequentially executes processes of steps 1615 and 1620 described below. Then, the CPU proceeds with the process to a step 1695 to terminate this routine once.

Step 1615: The CPU sets the flow rate acquired by adding the device-required flow rate CWdev_req to the minimum flow rate CWmin as the target discharge flow rate CWtgt (=CWmin+CWdev_req).

Step 1620: The CPU controls the activation of the engine pump 51 to control the pump discharge flow rate CWpump to the target discharge flow rate CWtgt (=CWmin+CWdev_req) set at the step 1615. In addition, the CPU controls the opening degree Dcw of the cooling water flow rate control valve 54 to flow the cooling water having the device-required flow rate CWdev_req into the branch engine water passage 668 from the second water passage 62.

On the other hand, when the process to cool the cooling-required devices is not requested, the CPU determines "No" at the step 1610 and then, sequentially executes processes of steps 1625 and 1630 described below. Then, the CPU proceeds with the process to the step 1695 to terminate this routine once.

Step 1320: The CPU sets the minimum flow rate CWmin as the target discharge flow rate CWtgt (=CWmin).

Step 1630: The CPU controls the activation of the engine pump 51 to control the pump discharge flow rate CWpump to the target discharge flow rate CWtgt (=CWmin) set at the step 1625. In addition, the CPU controls the opening degree Dcw of the cooling water flow rate control valve 54 to control the cooling water flow rate control valve 54 in the full open state.

When the first water temperature TW1 is equal to or higher than the first water temperature threshold TW1th at a point of time of executing a process of the step 1605, the CPU determines "No" at the step 1605 and then, proceeds with the process to a step 1635 to determine whether the second water temperature TW2 is lower than the full closed water temperature TW2close.

When the second water temperature TW2 is lower than the full closed water temperature TW2close, the CPU determines "Yes" at the step 1635 and then, proceeds with the process to a step 1640 to determine whether the process to cool the cooling-required devices is requested.

When the process to cool the cooling-required devices is requested, the CPU determines "Yes" at the step 1640 and then, sequentially executes processes of steps 1645 and 1650 described below. Then, the CPU proceeds with the process to the step 1695 to terminate this routine once.

Step 1645: The CPU applies the current engine speed NE, the current engine load KL, the current exhaust thermostatic valve opening degree Dex, and the current EGR control valve opening degree Degr to the look-up table MapCW1(NE,KL,Dex,Degr) to acquire the base discharge flow rate CW1. In addition, the CPU sets the flow rate acquired by adding the device-required flow rate CWdev_req to the acquired base discharge flow rate CW1 as the target discharge flow rate CWtgt (=CW1+CWdev_req).

Step 1650: The CPU controls the activation of the engine pump 51 to control the pump discharge flow rate CWpump to the target discharge flow rate CWtgt (=CW1+CWdev_req) set at the step 1645. In addition, the CPU controls the opening degree Dcw of the cooling water flow rate control valve 54 to flow the cooling water having the device-required flow rate CWdev_req into the branch engine water passage 668 from the second water passage 62.

On the other hand, when the process to cool the cooling-required devices is not requested, the CPU determines "No" at the step 1640 and then, sequentially executes processes of steps 1655 and 1660 described below. Then, the CPU proceeds with the process to the step 1695 to terminate this routine once.

Step 1655: The CPU applies the current engine speed NE, the current engine load KL, the current exhaust thermostatic valve opening degree Dex, and the current EGR control valve opening degree Degr to the look-up table MapCW1(NE,KL,Dex,Degr) to acquire the base discharge flow rate CW1. In addition, the CPU sets the acquired base discharge flow rate CW1 as the target discharge flow rate CWtst (=CW1).

Step 1660: The CPU controls the activation of the engine pump 51 to control the pump discharge flow rate CWpump to the target discharge flow rate CWtgt (=CW1) set at the step 1655. In addition, the CPU controls the opening degree Dcw of the cooling water flow rate control valve 54 to control the cooling water flow rate control valve 54 in the full open state.

When the second water temperature TW2 is equal to or higher than the full closed water temperature TW2close at a point of time of executing a process of the step 1635, the CPU determines "No" at the step 1635 and then, proceeds with the process to a step 1665 to determine whether the process to cool the cooling-required devices is requested.

When the process to cool the cooling-required devices is requested, the CPU determines "Yes" at the step 1665 and then, sequentially executes processes of steps 1670 and 1675 described below. Then, the CPU proceeds with the process to the step 1695 to terminate this routine once.

Step 1670: The CPU applies the current engine speed NE, the current engine load KL, and the current EGR control valve opening degree Degr to the look-up table MapCW2(NE,KL,Degr) to acquire the base discharge flow rate CW2. In addition, the CPU sets the flow rate acquired by adding the device-required flow rate CWdev_req to the acquired base discharge flow rate CW2 as the target discharge flow rate CWtgt (=CW2+CWdev_req).

Step 1675: The CPU controls the activation of the engine pump 51 to control the pump discharge flow rate CWpump to the target discharge flow rate CWtgt (=CW2+CWdev_req) set at the step 1670. In addition, the CPU controls the opening degree Dcw of the cooling water flow rate control valve 54 to flow the cooling water having the device-required flow rate CWdev_req into the branch engine water passage 66B from the second water passage 62.

On the other hand, when the process to cool the cooling-required devices is not requested, the CPU determines "No" at the step 1665 and then, sequentially executes processes of steps 1680 and 1685 described below. Then, the CPU proceeds with the process to the step 1695 to terminate this routine once.

Step 1680: The CPU applies the current engine speed NE, the current engine load KL, and the current EGR control valve opening degree Degr to the look-up table MapCW2(NE,KL,Degr) to acquire the base discharge flow rate CW2. In addition, the CPU sets the acquired base discharge flow rate CW2 as the target discharge flow rate CWtgt.

Step 1685: The CPU controls the activation of the engine pump 51 to control the pump discharge flow rate CWpump to the target discharge flow rate CWtgt (=CW2) set at the step 1680. In addition, the CPU controls the opening degree Dcw of the cooling water flow rate control valve 54 to control the cooling water flow rate control valve 54 in the full open state.

The specific operation of the third modified control apparatus has been described. With the third modified control apparatus, the heat exchange cooling water flow rate CWheat is larger when the branch exhaust gas flow rate GASin is large, than when the branch exhaust gas flow rate GASin is small (see the processes of the steps 1645 to 1660) while (i) the EGR control is executed, and (ii) the exhaust heat recovery function is performed (see a determination "No" at the steps 1605 and a determination "Yes" at the step 1635). Thereby, it can be ensured to decrease the EGR gas temperature TGegr to the optimal temperature TGegr_opt when (i) the EGR control is executed, and (ii) the exhaust heat recovery function is performed.

What is claimed is:

1. A control apparatus of an internal combustion engine, comprising:

an EGR apparatus having an EGR gas supply function to supply, to an intake passage of the internal combustion engine as an EGR gas, at least a part of an exhaust gas discharged from at least one combustion chamber of the internal combustion engine to an exhaust passage of the internal combustion engine;

an exhaust heat recovery cooler apparatus having:

an exhaust gas supplying function to (i) draw at least a part of the exhaust gas, which is discharged from the at least one combustion chamber, into the exhaust heat recovery cooler apparatus from the exhaust passage, (ii) cool the drawn exhaust gas by cooling water, and (iii) supply the cooled exhaust gas to the EGR apparatus as the EGR gas when an EGR control to supply the exhaust gas to the intake passage as the EGR gas by the EGR apparatus is executed; and an exhaust heat recovery function to (i) draw at least a part of the exhaust gas, which is discharged from the at least one combustion chamber, into the exhaust heat recovery cooler apparatus from the exhaust passage, (ii) cool the drawn exhaust gas by cooling water, and (iii) return the cooled exhaust gas to the exhaust passage, wherein the exhaust heat recovery cooler apparatus comprises an exhaust valve configured to control an amount of exhaust gas directed into the exhaust heat recovery cooler apparatus from the exhaust passage, and a position of the exhaust valve is controlled based on a temperature of the cooling water; and an electronic control unit which controls an activation of the EGR apparatus, wherein the electronic control unit is configured to control a heat exchange cooling water flow rate which is a flow rate of the cooling water supplied to the exhaust heat recovery cooler apparatus, to a larger flow rate when (i) the electronic control unit controls the activation of the EGR apparatus to execute the EGR control, and (ii) the exhaust heat recovery cooler apparatus performs the exhaust heat recovery function, than when (i) the electronic control unit controls the activation of the EGR apparatus to execute the EGR control, and (ii) the exhaust heat recovery cooler apparatus does not perform the exhaust heat recovery function, wherein the electronic control unit is configured to control the heat exchange cooling water flow rate to the larger flow rate when (i) the electronic control unit controls the activation of the EGR apparatus to execute the EGR control, (ii) the exhaust heat recovery function is not performed, and (iii) a flow rate of the EGR gas is relatively large, than when (i) the electronic control unit controls the activation of the EGR apparatus to execute the EGR control, (ii) the exhaust heat recovery function is not performed, and (iii) the flow rate of the EGR gas is relatively small.

2. The control apparatus of the internal combustion engine as set forth in claim 1, wherein the electronic control unit is configured to control the heat exchange cooling water flow rate to the larger flow rate when (i) the electronic control unit controls the activation of the EGR apparatus to execute the EGR control, (ii) the exhaust heat recovery function is performed, and (iii) a flow rate of the exhaust gas drawn into the exhaust heat recovery cooler apparatus is relatively large, than when (i) the electronic control unit controls the activation of the EGR apparatus to execute the EGR control, (ii) the exhaust heat recovery function is performed, and (iii) the flow rate of the exhaust gas drawn into the exhaust heat recovery cooler apparatus is relatively small.

3. The control apparatus of the internal combustion engine as set forth in claim 2, wherein the electronic control unit is configured to control the heat exchange cooling water flow rate to increase the flow rate as the flow rate of the exhaust gas drawn into the exhaust heat recovery cooler apparatus increases when (i) the electronic control unit controls the activation of the EGR apparatus to execute the EGR control, and (ii) the exhaust heat recovery function is performed.

4. The control apparatus of the internal combustion engine as set forth in claim 1, wherein the electronic control unit is configured to control the heat exchange cooling water flow rate to the larger flow rate when (i) the electronic control unit controls the activation of the EGR apparatus to execute the EGR control, (ii) the exhaust heat recovery function is performed, and (iii) a flow rate of the exhaust gas discharged from the at least one combustion chamber to the exhaust passage is equal to or greater than a predetermined flow rate, than when (i) the electronic control unit controls the activation of the EGR apparatus to execute the EGR control, (ii) the exhaust heat recovery function is performed, and (iii) the flow rate of the exhaust gas discharged from the at least one combustion chamber to the exhaust passage is smaller than the predetermined flow rate.

5. The control apparatus of the internal combustion engine as set forth in claim 1, wherein the electronic control unit is configured to control the heat exchange cooling water flow rate to the flow rate increased as the flow rate of the EGR gas increases when (i) the electronic control unit controls the activation of the EGR apparatus to execute the EGR control, and (ii) the exhaust heat recovery function is not performed.

6. The control apparatus of the internal combustion engine as set forth in claim 1, wherein the control apparatus comprises a pump which supplies the cooling water to the exhaust heat recovery cooler apparatus, and the electronic control unit is configured to control the heat exchange cooling water flow rate by controlling an activation of the pump.

7. The control apparatus of the internal combustion engine as set forth in claim 6, wherein the control apparatus comprises a cooling water flow rate control valve which controls the flow rate of the cooling water supplied to the exhaust heat recovery cooler apparatus from the pump, and the electronic control unit is configured to control the heat exchange cooling water flow rate by controlling (i) the activation of the pump and (ii) an opening degree of the cooing water flow rate control valve.

8. The control apparatus of the internal combustion engine as set forth in claim 1, wherein the electronic control unit is configured to control the activation of the EGR apparatus to execute the EGR control when a temperature of the cooling water discharged from the internal combustion engine is equal to or higher than a predetermined first temperature threshold.

9. The control apparatus of the internal combustion engine as set forth in claim 1, wherein the exhaust heat recovery cooler apparatus is configured to perform the exhaust heat recovery function when a temperature of the cooling water supplied to the exhaust heat recovery cooler apparatus is lower than a predetermined second temperature threshold.

10. The control apparatus of the internal combustion engine as set forth in claim 1, wherein the electronic control unit is configured to control the activation of the EGR apparatus to execute the EGR control when a temperature of the cooling water discharged from the internal combustion engine is equal to or higher than a predetermined first temperature threshold, the exhaust heat recovery cooler apparatus is configured to perform the exhaust heat recovery function when a temperature of the cooling water supplied to the exhaust heat recovery cooler apparatus is lower than a predetermined second temperature threshold, and the predetermined second temperature threshold is set to a temperature higher than the predetermined first temperature threshold.

11. The control apparatus of the internal combustion engine as set forth in claim 1, wherein the electronic control unit is configured to control the heat exchange cooling water flow rate to a minimum flow rate when (i) the electronic control unit controls the activation of the EGR apparatus to stop executing the EGR control, and (ii) the exhaust heat recovery function is performed.

12. A control apparatus of an internal combustion engine, comprising:

an EGR apparatus having an EGR gas supply function to supply, to an intake passage of the internal combustion engine as an EGR gas, at least a part of an exhaust gas discharged from at least one combustion chamber of the internal combustion engine to an exhaust passage of the internal combustion engine;

an exhaust heat recovery cooler apparatus having:

an exhaust gas supplying function to (i) draw at least a part of the exhaust gas, which is discharged from the at least one combustion chamber, into the exhaust heat recovery cooler apparatus from the exhaust passage, (ii) cool the drawn exhaust gas by a coolant, and (iii) supply the cooled exhaust gas to the EGR apparatus as the EGR gas when an EGR control to supply the exhaust gas to the intake passage as the EGR gas by the EGR apparatus is executed; and an exhaust heat recovery function to (i) draw at least a part of the exhaust gas, which is discharged from the at least one combustion chamber, into the exhaust heat recovery cooler apparatus from the exhaust passage, (ii) cool the drawn exhaust gas by the coolant, and (iii) return the cooled exhaust gas to the exhaust passage; and an electronic control unit which controls an activation of the EGR apparatus, wherein the electronic control unit is configured to control a coolant flow rate to a larger flow rate when (i) the electronic control unit controls the activation of the EGR apparatus to execute the EGR control, (ii) the exhaust heat recovery function is not performed, and (iii) a flow rate of the EGR gas is relatively large, than when (i) the electronic control unit controls the activation of the EGR apparatus to execute the EGR control, (ii) the exhaust heat recovery function is not performed, and (iii) the flow rate of the EGR gas is relatively small.

13. The control apparatus of the internal combustion engine as set forth in claim 12, wherein the exhaust heat recovery cooler apparatus comprises an exhaust valve.

14. The control apparatus of the internal combustion engine as set forth in claim 13, wherein the electronic control unit is configured to reduce the flow rate of the coolant in response to closing of the exhaust valve.

15. The control apparatus of the internal combustion engine as set forth in claim 13, wherein the exhaust valve is a thermostat, and a position of the exhaust valve is based on a temperature of the coolant.

16. A control apparatus of an internal combustion engine, comprising:

an EGR apparatus having an EGR gas supply function to supply, to an intake passage of the internal combustion engine as an EGR gas, at least a part of an exhaust gas discharged from at least one combustion chamber of the internal combustion engine to an exhaust passage of the internal combustion engine;

an exhaust heat recovery cooler apparatus having:

an exhaust gas supplying function to (i) draw at least a part of the exhaust gas, which is discharged from the at least one combustion chamber, into the exhaust heat recovery cooler apparatus from the exhaust passage, (ii) cool the drawn exhaust gas by a coolant, and (iii) supply the cooled exhaust gas to the EGR apparatus as the EGR gas when an EGR control to supply the exhaust gas to the intake passage as the EGR gas by the EGR apparatus is executed; and an exhaust heat recovery function to (i) draw at least a part of the exhaust gas, which is discharged from the at least one combustion chamber, into the exhaust heat recovery cooler apparatus from the exhaust passage, (ii) cool the drawn exhaust gas by the coolant, and (iii) return the cooled exhaust gas to the exhaust passage; and an electronic control unit which controls an activation of the EGR apparatus, wherein the electronic control unit is configured to control a flow rate of the coolant based on (i) whether the electronic control unit controls the activation of the EGR apparatus to execute the EGR control, (ii) whether the exhaust heat recovery cooler apparatus performs the exhaust heat recovery function, and (iii) a flow rate of the EGR gas, wherein the exhaust heat recovery cooler apparatus comprises an exhaust valve, wherein the exhaust valve is configured to prevent the exhaust gas drawn into the exhaust heat recovery cooler apparatus from returning to the exhaust passage based on a signal from the electronic control unit.

* * * * *